(12) United States Patent
Hashimura et al.

(10) Patent No.: US 11,475,231 B2
(45) Date of Patent: Oct. 18, 2022

(54) SURVEY SYSTEM AND SURVEY METHOD

(71) Applicant: KEISOKUGIKEN CO., LTD., Hyogo (JP)

(72) Inventors: Yoshito Hashimura, Hyogo (JP); Shoji Fujiwara, Hyogo (JP); Yuta Suhara, Hyogo (JP)

(73) Assignee: KEISOKUGIKEN CO., LTD., Hyogo (JP)

( * ) Notice: Subject to any disclaimer, the term of this patent is extended or adjusted under 35 U.S.C. 154(b) by 0 days.

(21) Appl. No.: 17/616,354

(22) PCT Filed: Dec. 10, 2020

(86) PCT No.: PCT/JP2020/045948
§ 371 (c)(1),
(2) Date: Dec. 3, 2021

(87) PCT Pub. No.: WO2021/117793
PCT Pub. Date: Jun. 17, 2021

(65) Prior Publication Data
US 2022/0207255 A1   Jun. 30, 2022

(30) Foreign Application Priority Data
Dec. 11, 2019   (JP) .............................. JP2019-224078

(51) Int. Cl.
*G06K 9/00* (2022.01)
*G06K 7/10* (2006.01)
(Continued)

(52) U.S. Cl.
CPC ......... *G06K 7/1417* (2013.01); *G01C 15/004* (2013.01); *G01C 15/06* (2013.01);
(Continued)

(58) Field of Classification Search
CPC .................................. G06K 9/00; G06K 7/10
(Continued)

(56) References Cited

U.S. PATENT DOCUMENTS 7,184,036 B2 *  2/2007  Dimsdale ............... G01C 11/00
                                                        382/181
7,215,430 B2 *  5/2007  Kacyra ................... G01S 17/89
                                                        356/601
(Continued)

FOREIGN PATENT DOCUMENTS

CN       104778488 A       7/2015
JP       2004-257872 A     9/2004
(Continued)

OTHER PUBLICATIONS

Japanese Office Action corresponding to counterpart Japan patent application No. 2019-224078 dated Jan. 17, 2020 with English translation.
(Continued)

*Primary Examiner* — Seyed H Azarian
(74) *Attorney, Agent, or Firm* — Renner, Otto, Boisselle & Sklar, LLP

(57) ABSTRACT

A survey machine capturing control part captures a captured image including a 2D mark on a survey object using a telescope. A survey machine recognizing control part detects a 2D mark image as a captured pattern, and recognizes a specific identification pattern by collating the detected captured pattern with an identification pattern of a 2D mark. A survey machine information displaying control part acquires and displays survey information on the captured image. A calculating control part calculates differences between a mark center position of 2D coordinates and a center position of 2D coordinates of a crosshair of the telescope. An adjusting control part adjusts a direction of the telescope so that the center position of the crosshair matches the mark
(Continued)

center position. A ranging control part ranges the mark center position as measured values of coordinates. An information storing control part stores the measured values in the mark information table.

9 Claims, 21 Drawing Sheets

(51) Int. Cl.
    *G06K 7/14*     (2006.01)
    *G06T 7/73*     (2017.01)
    *G06T 7/90*     (2017.01)
    *G01C 15/00*     (2006.01)
    *G01C 15/06*     (2006.01)

(52) U.S. Cl.
    CPC ............ *G06K 7/10722* (2013.01); *G06T 7/73* (2017.01); *G06T 7/90* (2017.01); *G06T 2207/20164* (2013.01); *G06T 2207/30204* (2013.01)

(58) Field of Classification Search
    USPC ....... 382/100, 103, 106, 113, 151, 153, 155, 382/162, 168, 173, 181, 193, 199, 382/219–220, 254, 276, 286–291; 356/614, 601, 4.01; 348/187; 235/422, 235/462.11
    See application file for complete search history.

(56) References Cited

U.S. PATENT DOCUMENTS

| | | | | |
|---|---|---|---|---|
| 7,446,863 | B2* | 11/2008 | Nishita | G01C 15/002 356/614 |
| 2007/0182952 | A1* | 8/2007 | Nishita | G01C 15/002 356/614 |
| 2010/0141775 | A1* | 6/2010 | Vogel | G01C 25/00 348/187 |
| 2015/0029489 | A1* | 1/2015 | Metzler | G01S 7/4812 356/4.01 |
| 2019/0154439 | A1* | 5/2019 | Binder | G01B 11/26 |

FOREIGN PATENT DOCUMENTS

| | | |
|---|---|---|
| JP | 2017-15445 A | 1/2017 |
| JP | 2017-72442 A | 4/2017 |
| JP | 2017-201281 A | 11/2017 |

OTHER PUBLICATIONS

Decision of Patent corresponding to counterpart Japan patent application No. 2019-224078 dated Apr. 1, 2020 with English translation.
International Search Report (ISR) (form 210) corresponding to counterpart International Patent Application PCT/JP2020/045948 dated Jan. 26, 2021 with English translation.
Written Opinion of the International Searching Authority (WO/ISA) (form 237) corresponding to counterpart International Patent Application PCT/JP2020/045948 dated Jan. 26, 2021 with English translation.

* cited by examiner

[Fig. 1]
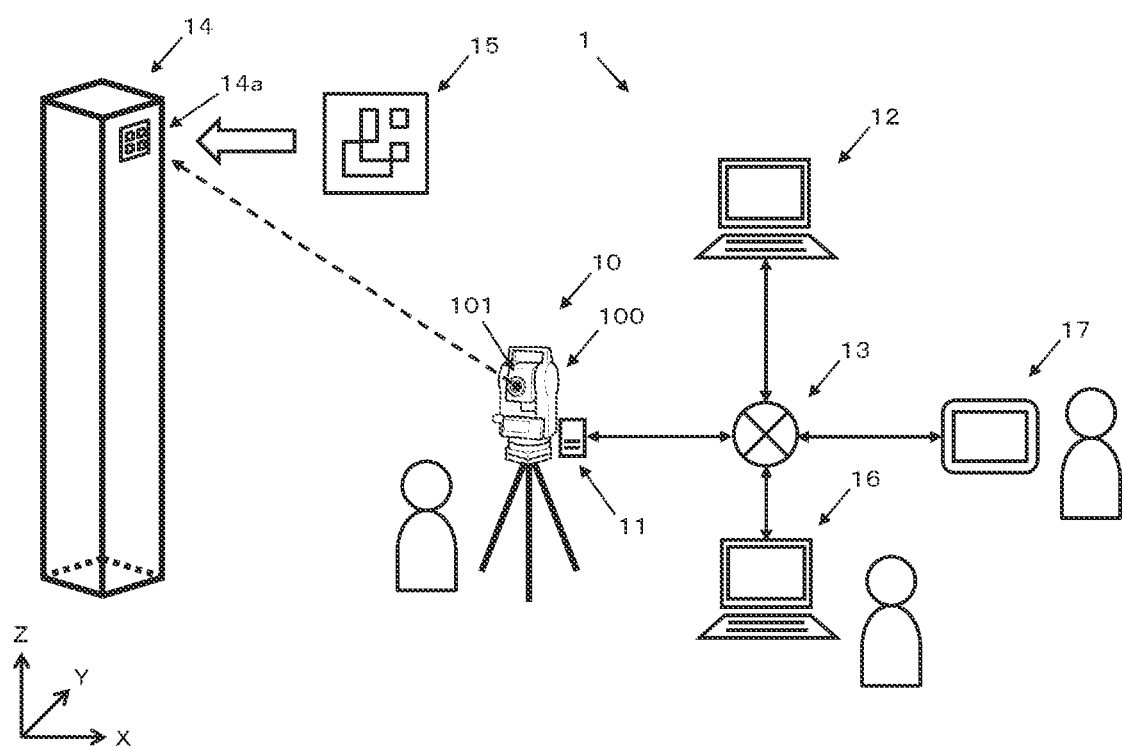

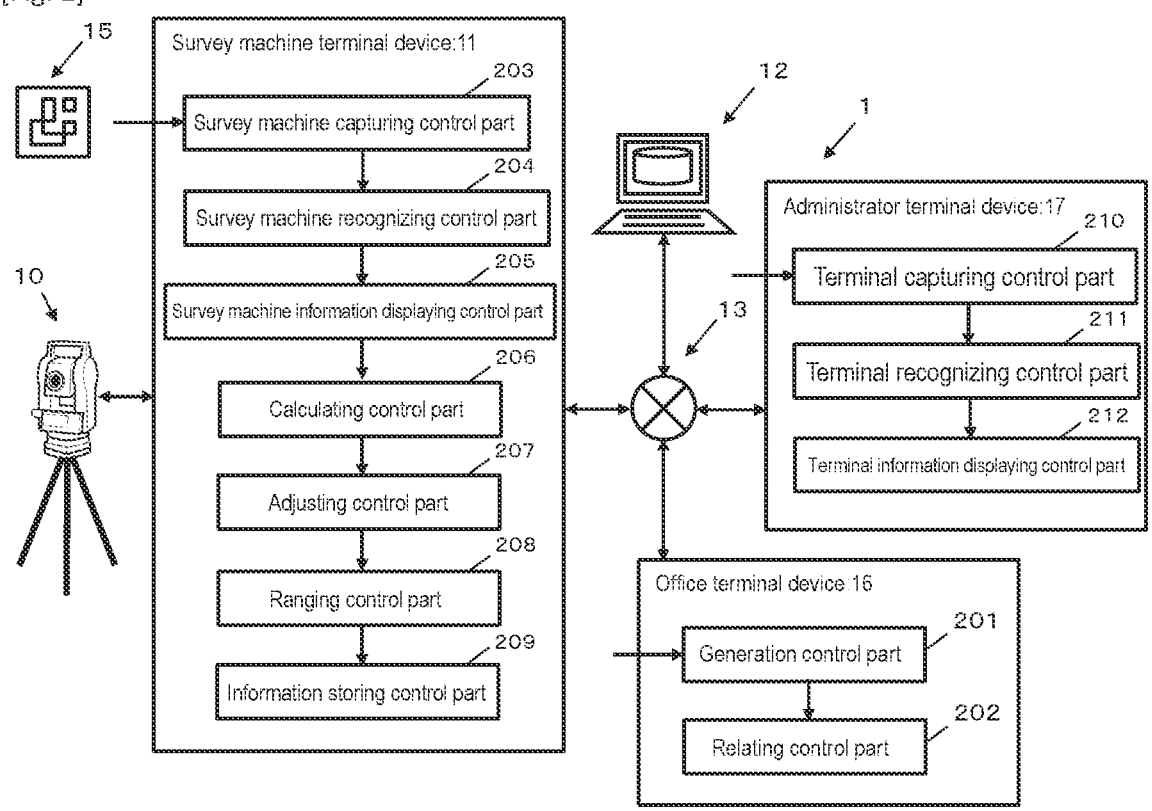
[Fig. 2]

[Fig. 3]
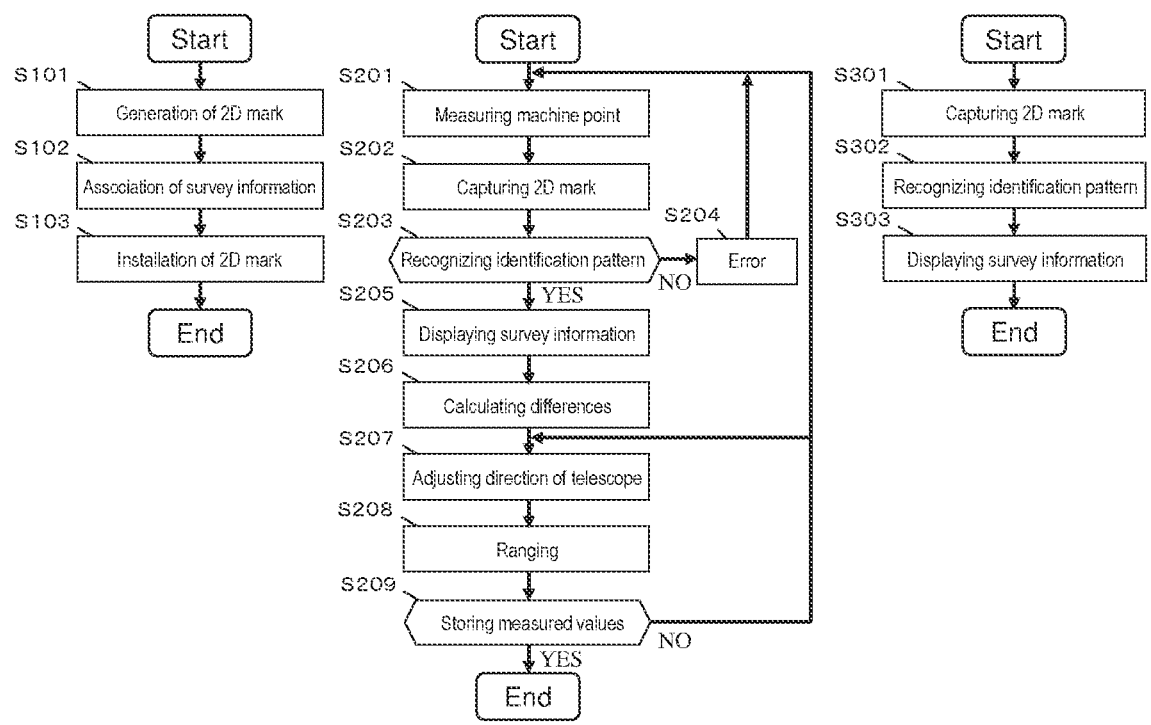

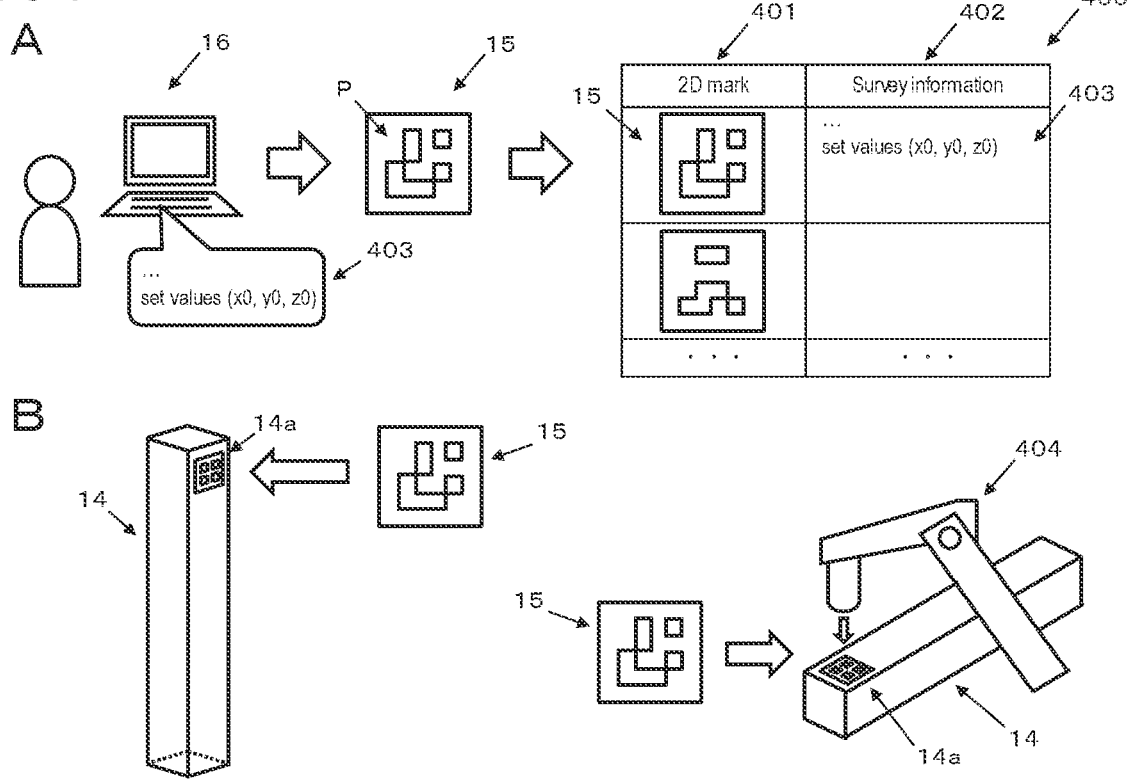
[Fig. 4]

[Fig. 5]
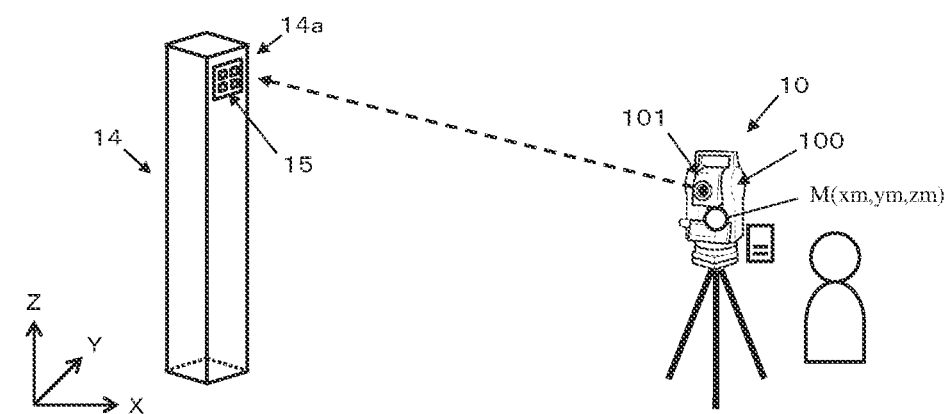
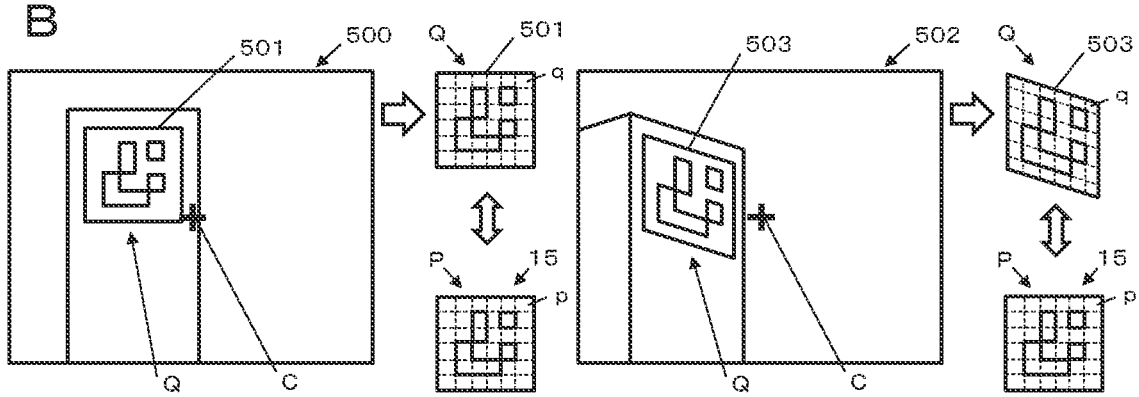

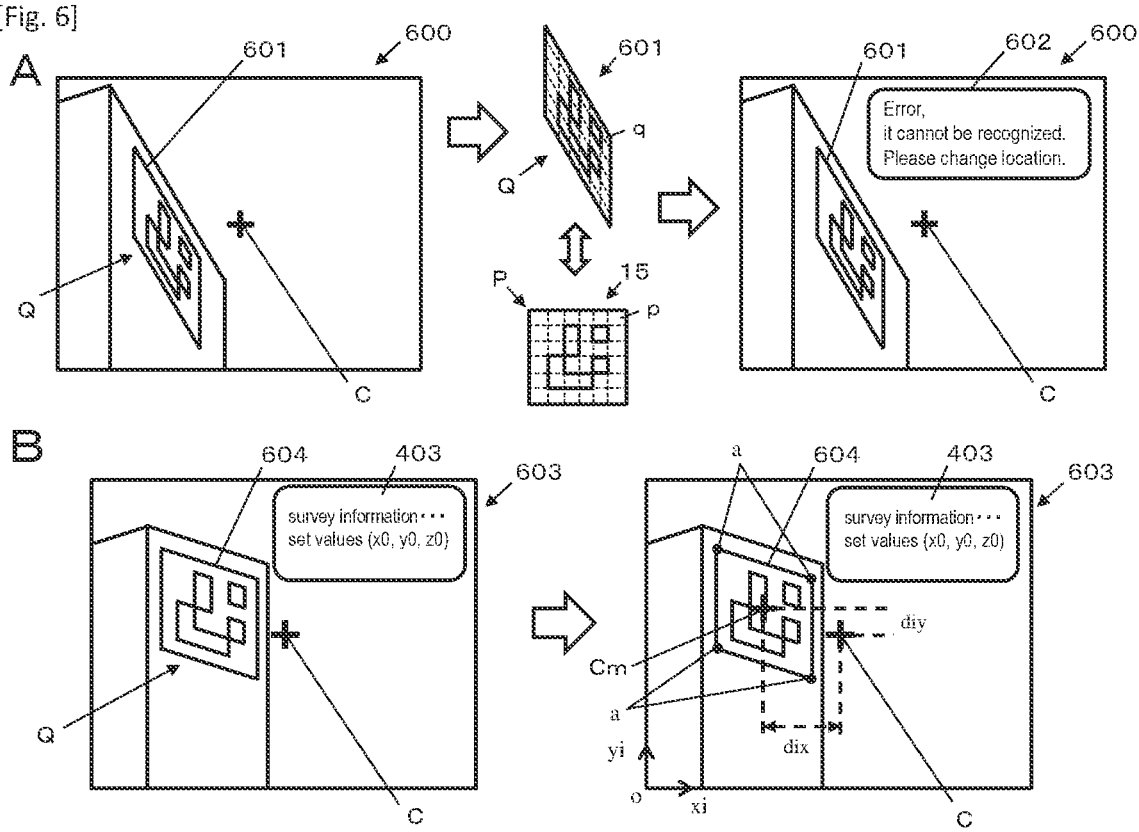

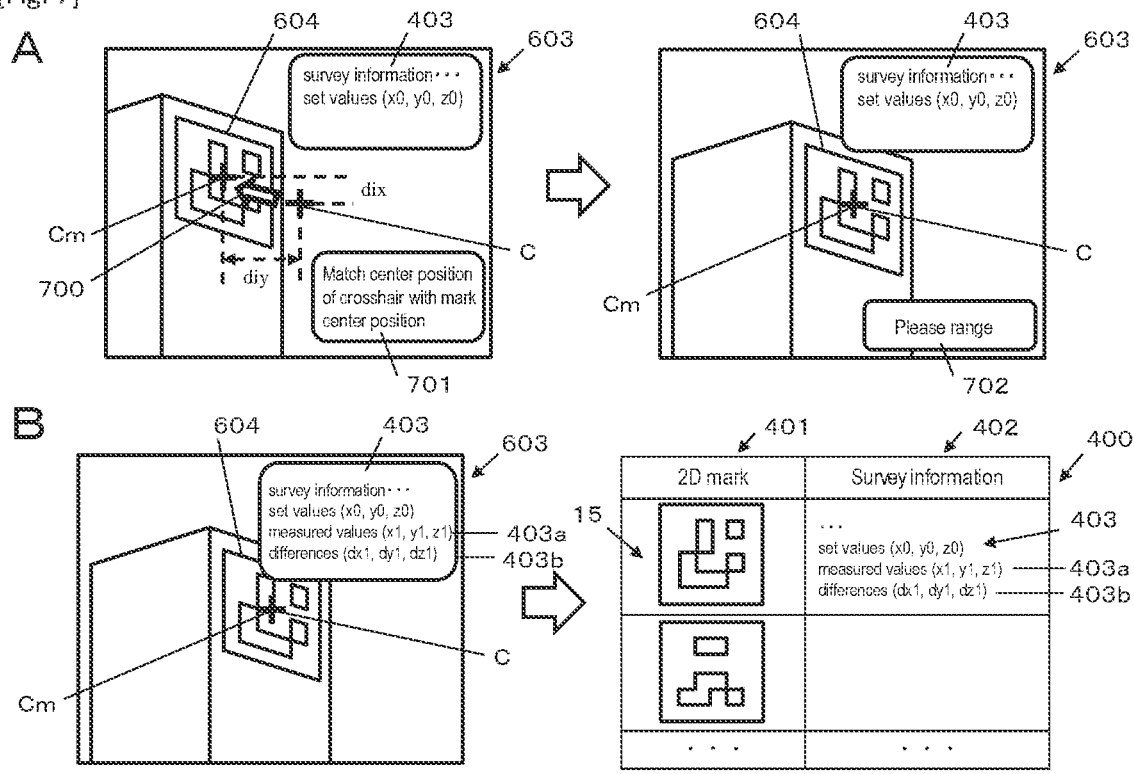

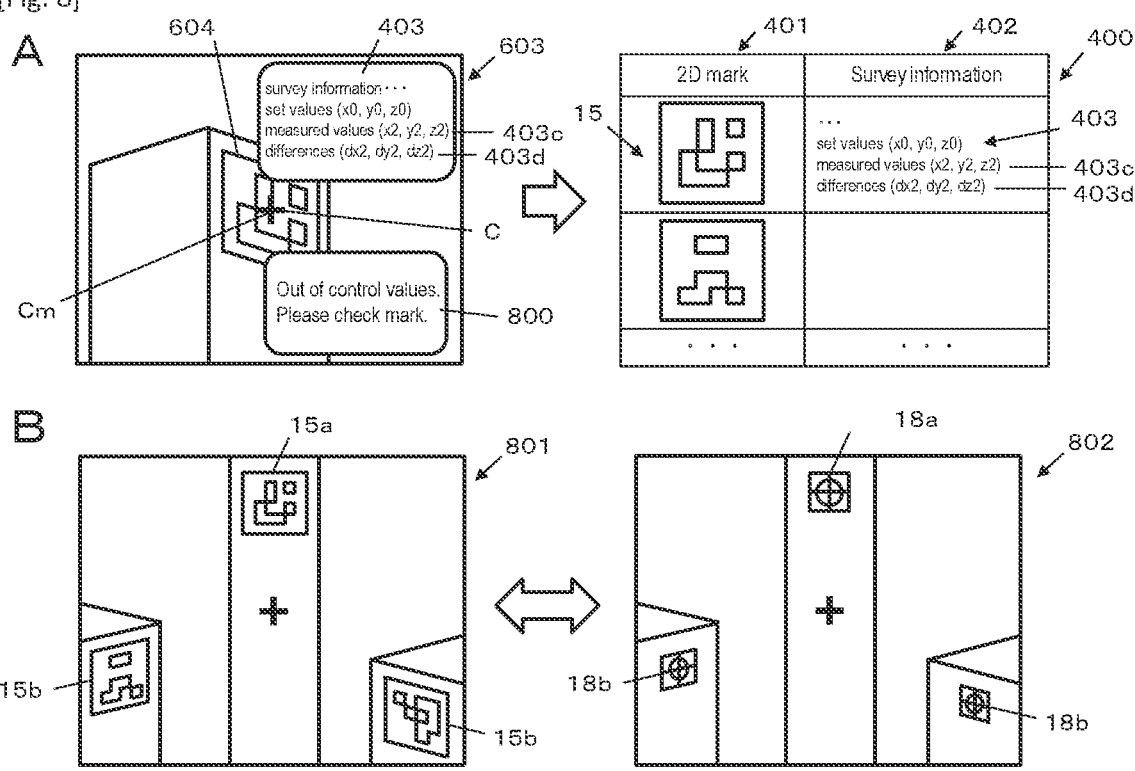
[Fig. 8]

[Fig. 9]
A
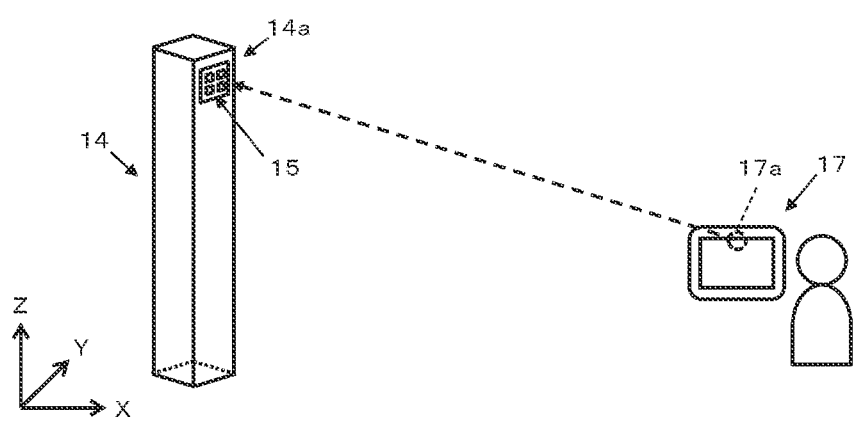
B
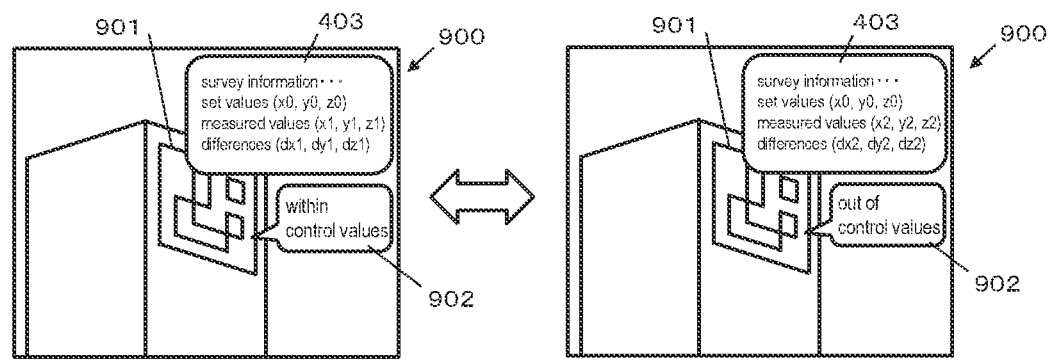

[Fig. 10]
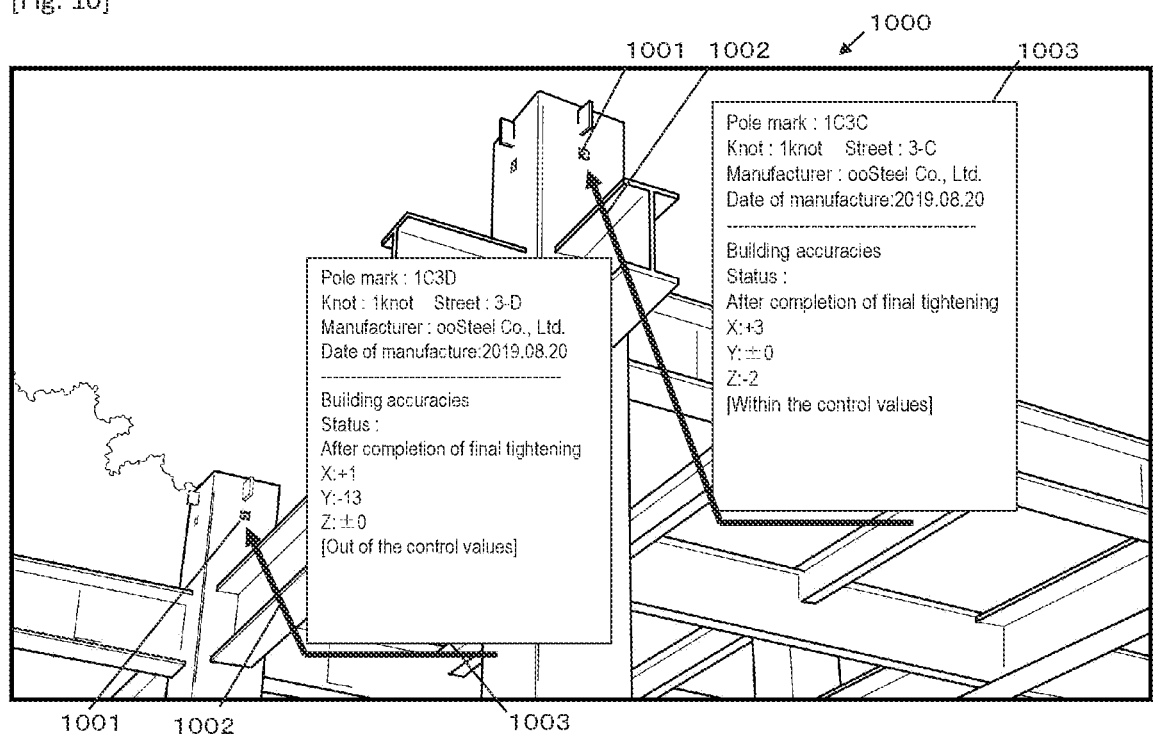

[Fig. 11]
A
| Angle | 0 degree | 9 degrees | 18 degrees | 27 degrees |
|---|---|---|---|---|
| Captured pattern | 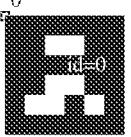 |  | 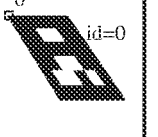 | 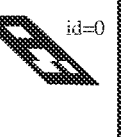 |
| Detection rate | ○ | ○ | ○ | ○ |
| Recognition rate | ○ | ○ | ○ | ○ |
B
| Angle | 0 degree | 9 degrees | 18 degrees | 27 degrees |
|---|---|---|---|---|
| Captured pattern | 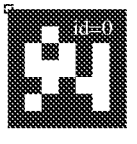 | 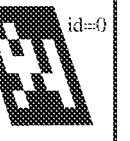 | 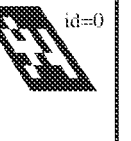 | 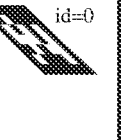 |
| Detection rate | ○ | ○ | ○ | ○ |
| Recognition rate | ○ | ○ | ○ | ○ |

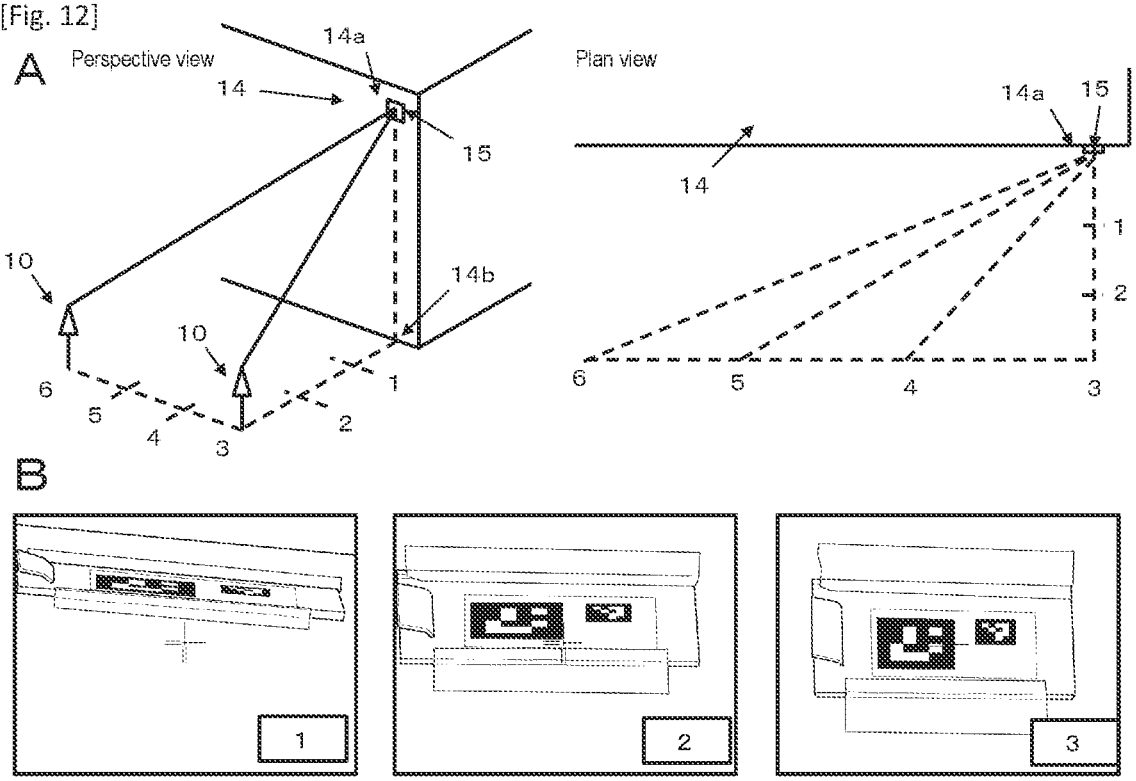

[Fig. 13]
A
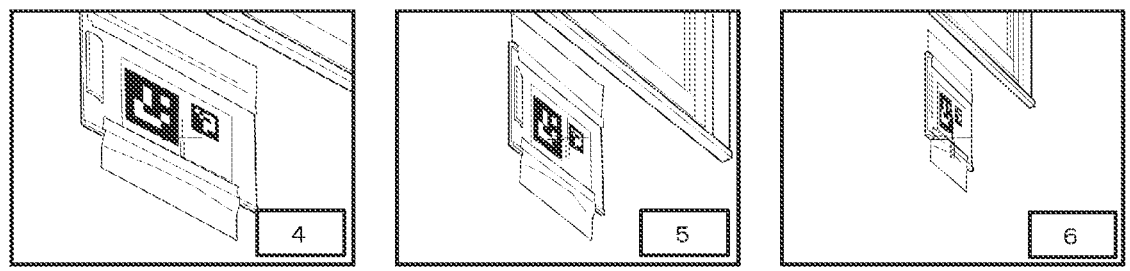
B
| | | Installation position | | | | | |
|---|---|---|---|---|---|---|---|
| | Size | 1 | 2 | 3 | 4 | 5 | 6 |
| 2D mark | 50 | ○ | ○ | ○ | ○ | ○ | ○ |
| | 100 | ○ | ○ | ○ | ○ | ○ | ○ |
| Target sheet | 30 | ○ | ○ | ○ | × | × | × |
| | 50 | ○ | ○ | ○ | × | × | × |

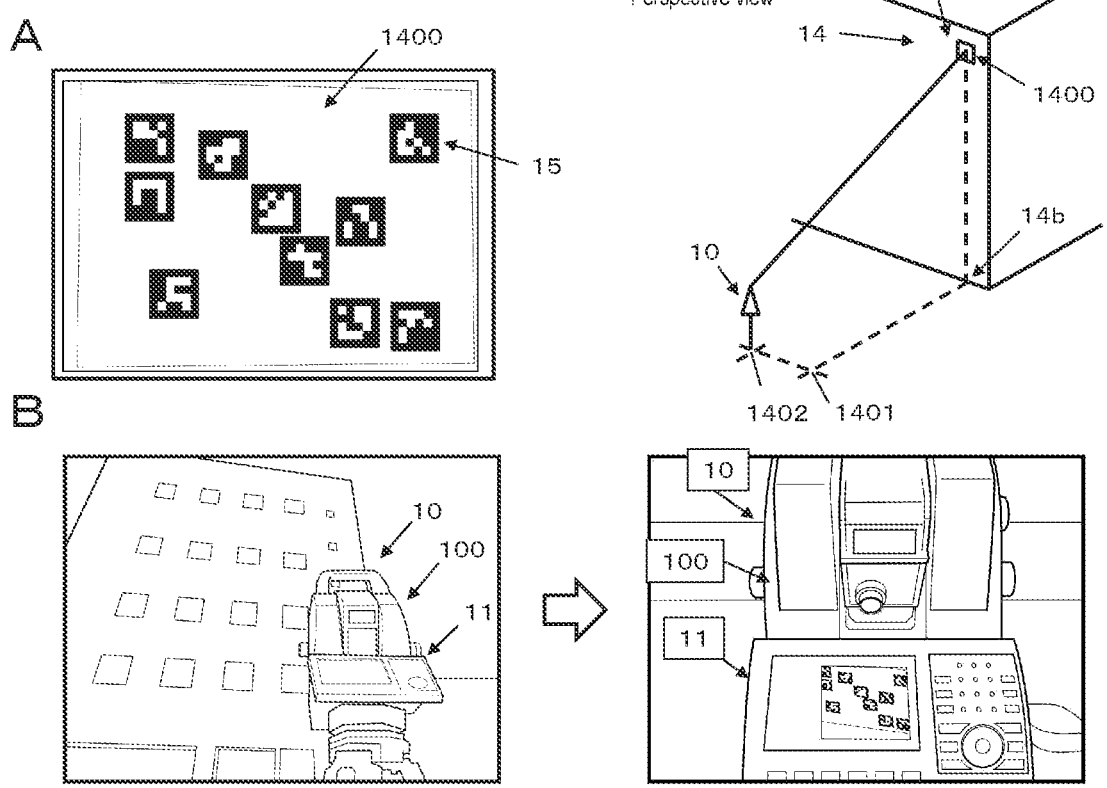
[Fig. 14]

[Fig. 15]
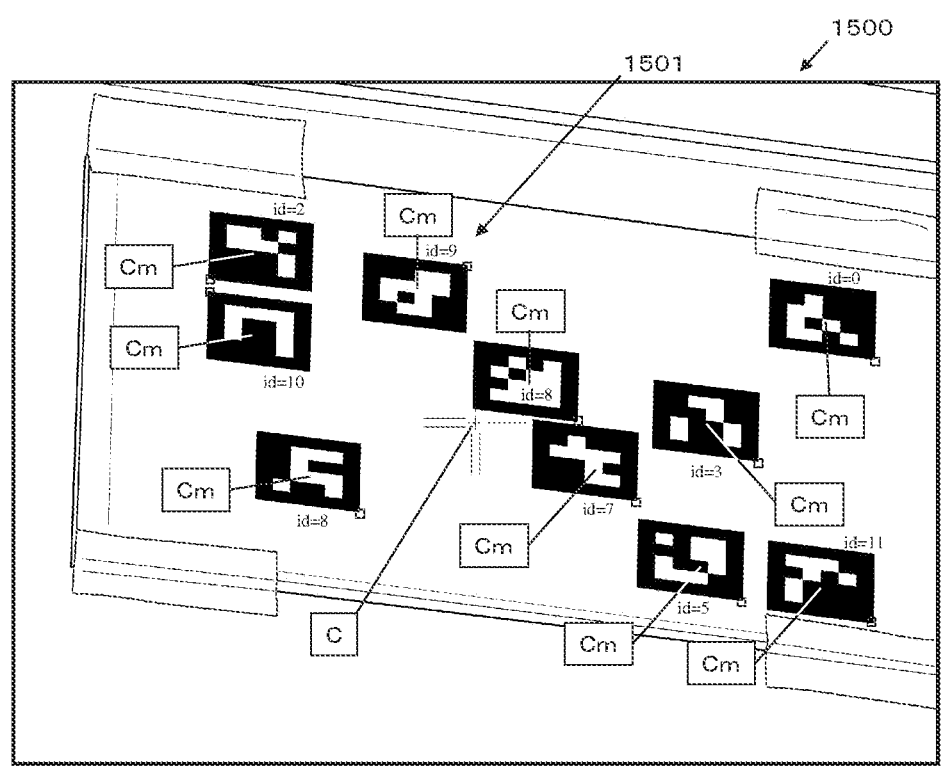

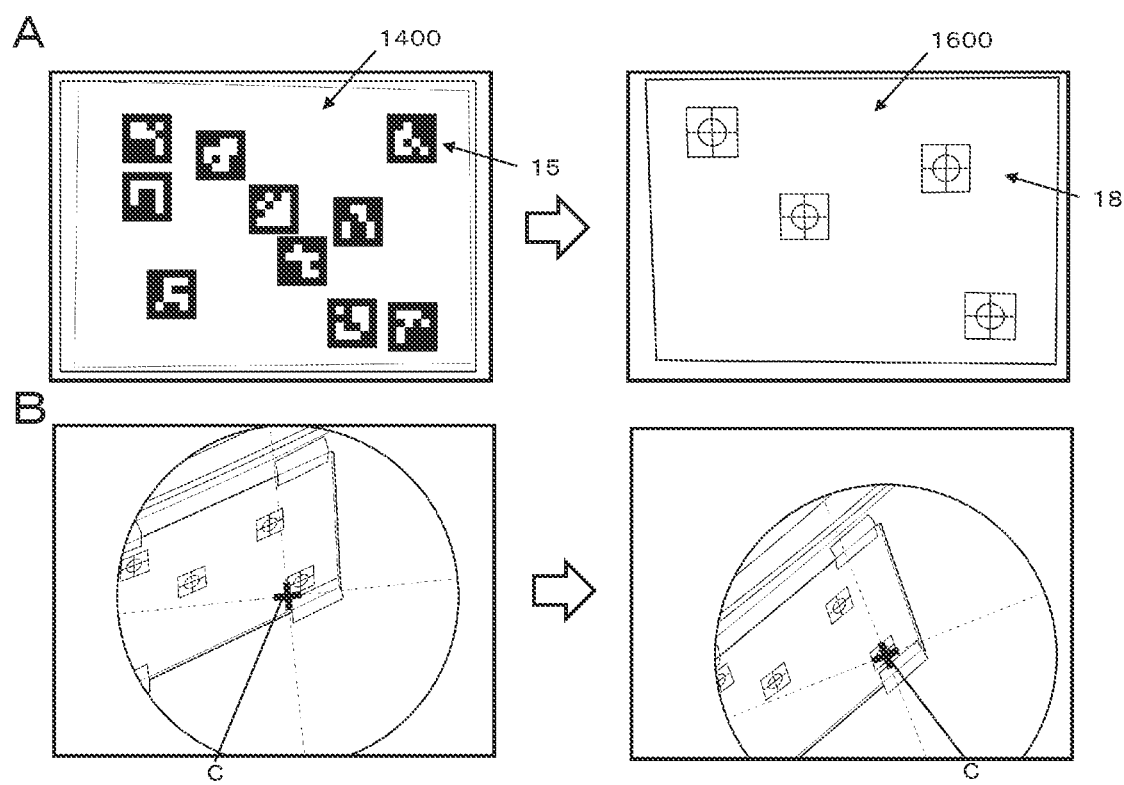
[Fig. 16]

[Fig. 17]
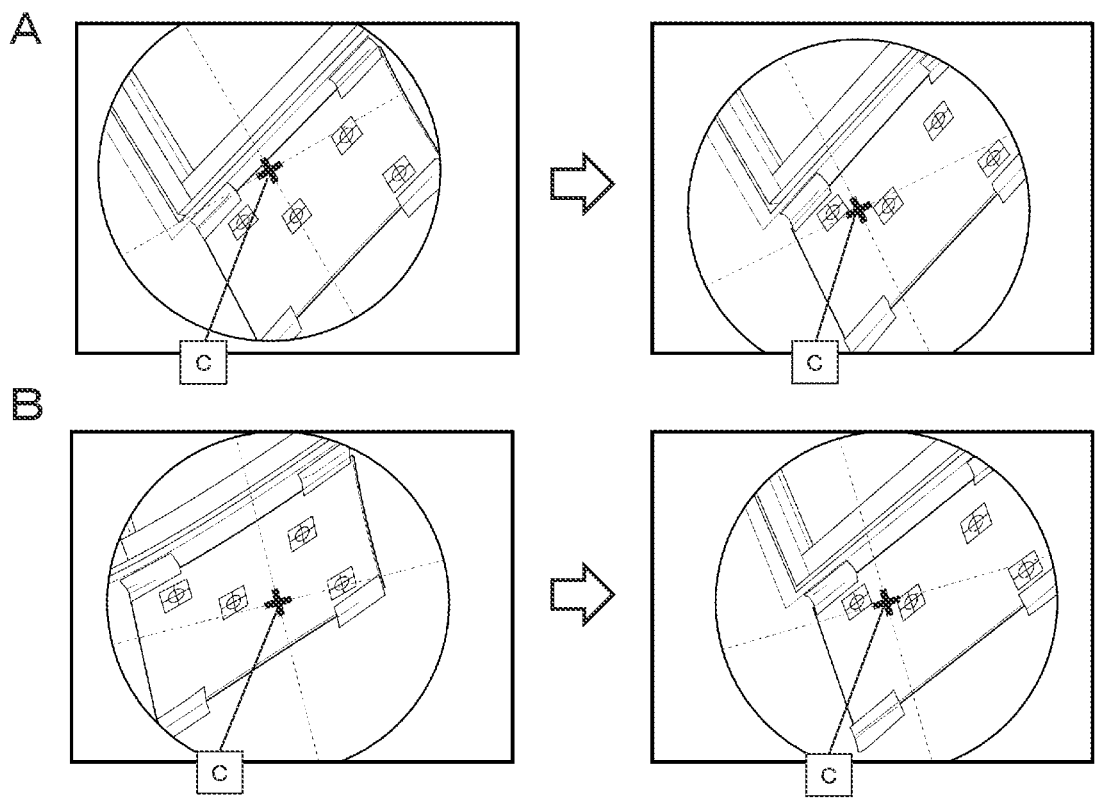

[Fig. 18]
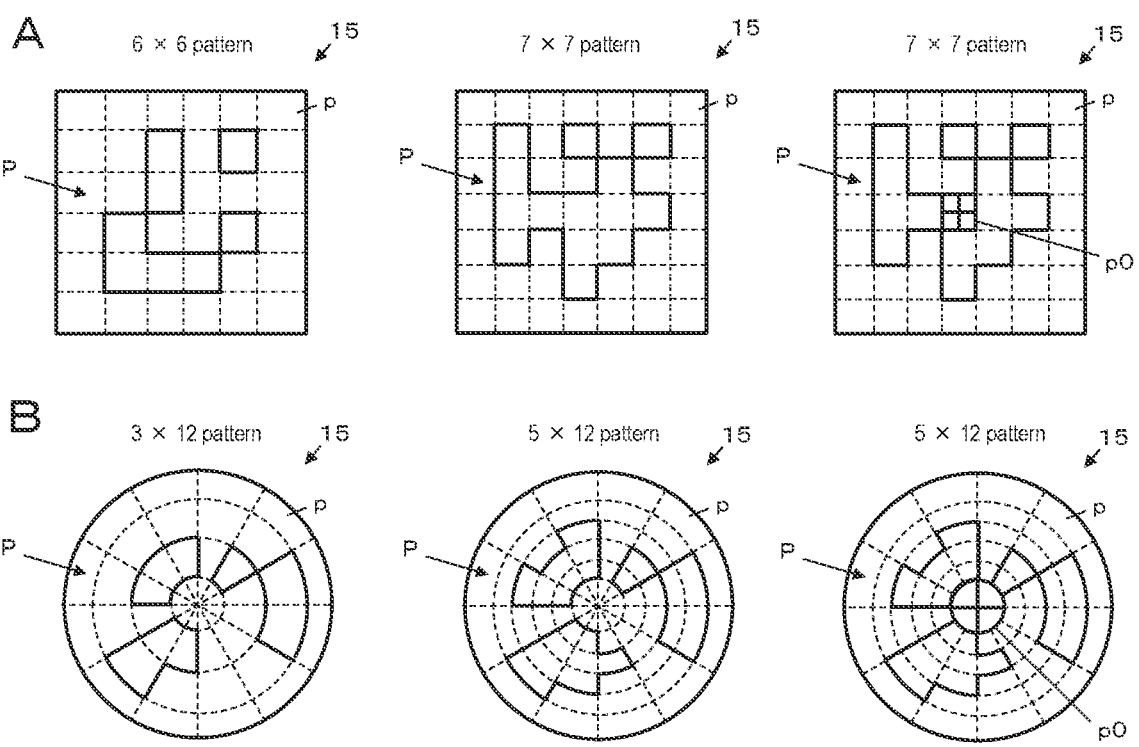

[Fig. 19]
A    Example
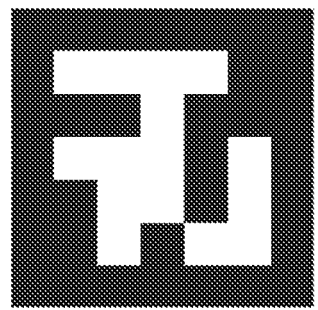
Comparative Example
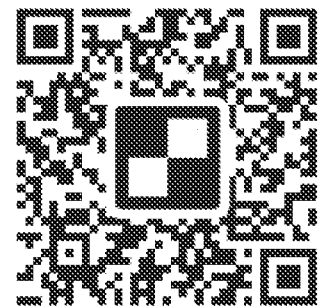
B    Perspective view
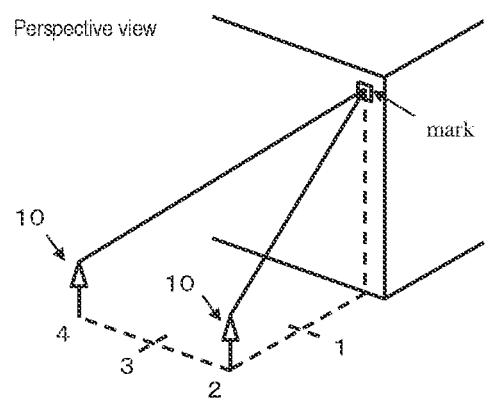
Plan view
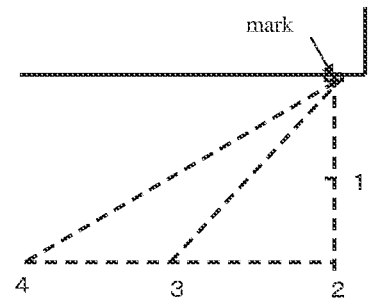

[Fig. 20]
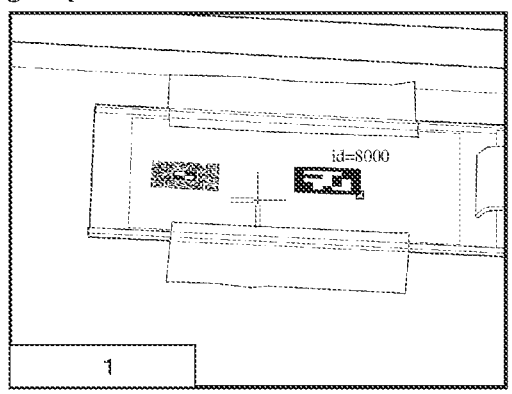
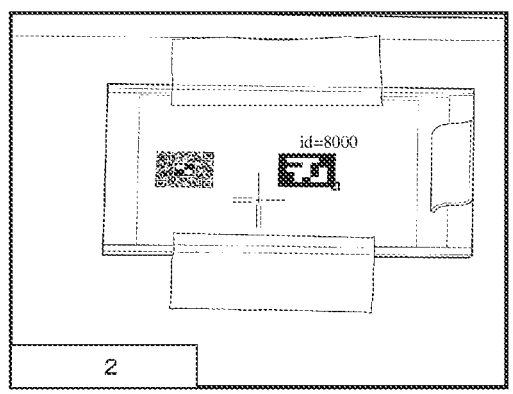
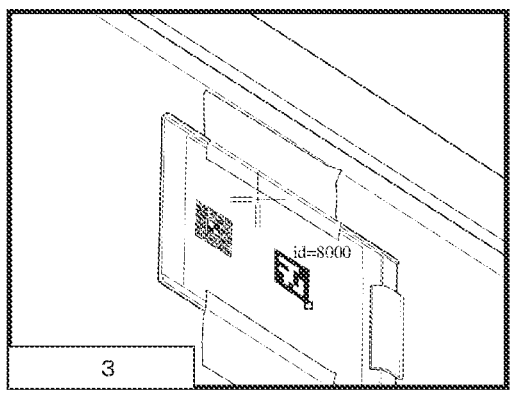
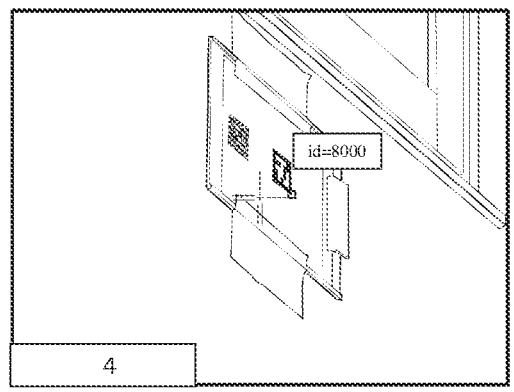

[Fig. 21]
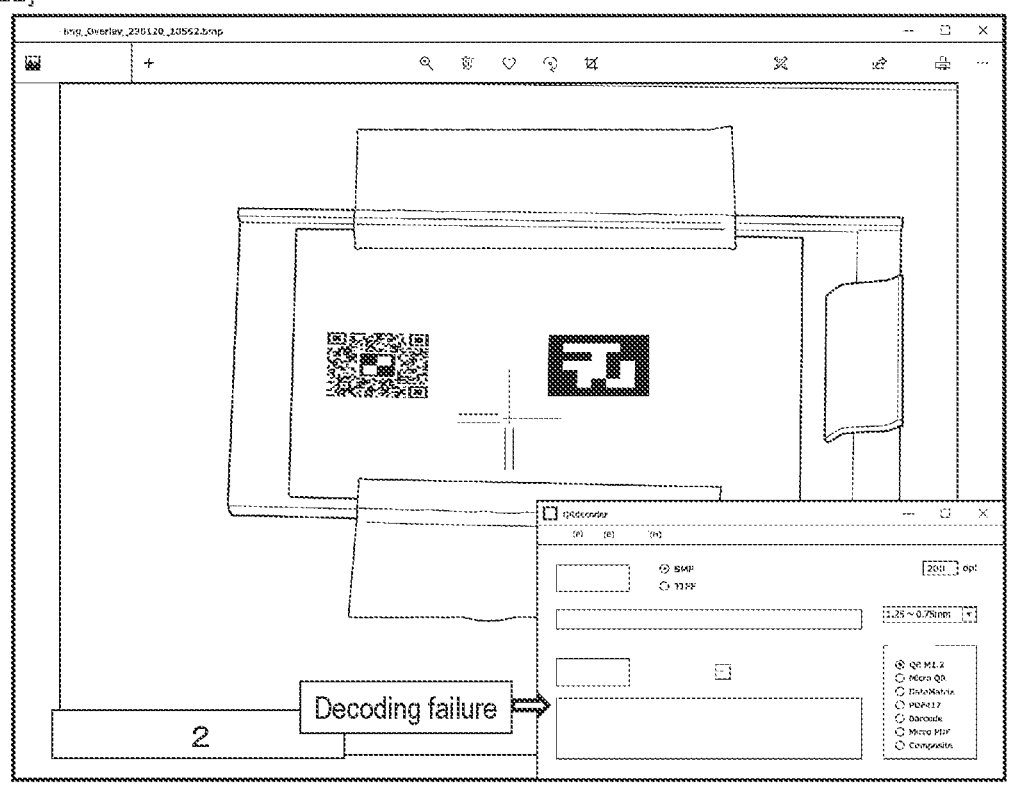

SURVEY SYSTEM AND SURVEY METHOD

This application is a national phase of International Application No. PCT/JP2020/045948 filed Dec. 10, 2020, which claims priority to Japanese Patent Application No. 2019-224078 filed Dec. 11, 2019, in the Japan Patent Office, which are hereby incorporated herein by reference.

TECHNICAL FIELD

The present invention relates to a survey system and a survey method.

BACKGROUND ART

Conventionally, there is survey related technologies using a characteristic mark (sign). For example, Patent Literature 1 discloses a target mark for a relative position posture measurement composed of four marks provided on a same plane and one mark provided on a different plane, and giving feature quantity these marks. Patent Literature 2 discloses a survey system including a prism and a total station that emits distance measuring light to the prism and measures a distance based on reflected distance measuring light from the prism. Patent Literature 3 discloses a surveying support device including an image acquisition part, an image analysis processing part using a designated mark, and a work support part. Patent Literature 4 discloses a target device provided with a spiral pattern display on a surface.

Patent Literature 5 discloses an automatic collimation device having a computer comparing measurement data with structure design data. Patent Literature 6 discloses a 2D bar code attached to a steel structure member. Patent Literature 7 discloses a measurement program sounding a warning sound or displaying an error on a display screen for calling attention when a detection mark cannot be detected from image data. Patent Literature 8 discloses a measuring device having a terminal comparing a predetermined measurement scheduled position with a measurement position of a reflection prism measured by a position measuring device, calculating a positional relationship, and graphically displaying the positional relationship between the measurement scheduled position of the reflection prism and an actually measured measurement position on a display part of the terminal.

CITATION LIST

Patent Literature

[PTL 1]
Japanese Unexamined Patent Application Publication No. Hei 05-149748
[PTL 2]
Japanese Unexamined Patent Application Publication No. 2016-138802
[PTL 3]
Japanese Unexamined Patent Application Publication No. 2017-151013
[PTL 4]
Japanese Unexamined Patent Application Publication No. 2019-011341
[PTL 5]
Japanese Unexamined Patent Application Publication No. 2017-201281
[PTL 6]
Chinese Unexamined Patent Application Publication No. 104778488
[PTL 7]
Japanese Unexamined Patent Application Publication No. 2017-015445
[PTL 8]
Japanese Unexamined Patent Application Publication No. 2017-072442

SUMMARY OF INVENTION

Technical Problem

In normal survey, a surveyor measures coordinates (3D coordinates, 3D coordinate values) of a target sheet by installing a special survey target sheet (reflection sheet) to a survey object of an architecture such as a pole or a building, installing a survey machine to a position (facing position) located in front of the target sheet, collimating the target sheet with a telescope of the survey machine, and ranging with the survey machine.

The survey machine irradiates laser in a collimation direction of the telescope at a ranging time, and detects an intensity of a reflected light of the laser reflected from the target sheet. The laser light is reflected from the survey machine on the target sheet, and the reflected light returns from the target sheet to the survey machine. Since the reflected light detected by the survey machine reciprocates a distance from the survey machine to the target sheet, a delay occurs by a reciprocating distance, and this delay becomes a phase difference. The survey machine calculates the distance to the target sheet based on the phase difference and measures the coordinates of the target sheet.

In the measurement of the coordinates of the target sheet, it is necessary that the reflected light returns with a constant intensity, for example, if an incident angle of the laser to the target sheet is set to be within about 45 degrees in the right and left from a position of the survey machine facing the target sheet (located in front of the target sheet), the survey machine can measure the coordinates of the target sheet. But the intensity of the reflected light becomes weaker as the incident angle is larger. The intensity of the reflected light detected by the survey machine varies depending on a brightness of an environment. For these reasons, it is preferable that the survey machine is located at the position facing the target sheet. Therefore, the surveyor installs the survey machine at the position facing the target sheet, and there is a problem that it takes time and effort to install the survey machine. In addition, when the surveyor looks at the telescope of the survey machine and manually collimates with the target sheet, a collimation accuracy to the target sheet depends on a skill of the surveyor, and there is a problem that human error for the collimation is likely to occur.

Currently, the survey machine is equipped with an automatic collimation function, and when the surveyor instructs an automatic collimation command to the survey machine with the telescope facing the target sheet, the survey machine irradiates laser in a collimation direction of the telescope, detects an intensity of a reflected light of the laser, and determines a center position of the target sheet based on a light quantity distribution of the reflected light. The same applies even if the target sheet is a prism for ranging. Therefore, in the case of an automatic collimation, it is preferable that the survey machine detects only the reflected light from a specific light reflecting object. On the other hand, in the case of the automatic collimation, unless the incident angle of the laser is within about 15 degrees in the right and left from the position of the survey machine facing the target sheet, the survey machine cannot properly detect the intensity of the reflected light from the target sheet, and there is a problem that it is impossible to collimate a specific target sheet. Also, if an architecture has light reflectors besides the target sheet, or if two or more target sheets are in close proximity, when the surveyor uses the automatic collimation function, because of the reflected light from multiple light reflectors, the survey machine cannot appropriately detect the intensity of the reflected light from the specific target sheet, and there is a problem that this collimation accuracy is lowered.

In addition, when two or more target sheets are close to the architecture, if the surveyor collimates the target sheet with the telescope, the surveyor may confuse which target sheet was collimated, and there is a problem that it is possible to mistakenly associate measured values of the measured target sheet with different target sheet.

Although the technique described in Patent Literature 1 can identify a mark, there is a problem that information cannot be added to the mark itself. In the technique described in Patent Literature 2, it is necessary to provide setting identification information separately from a prism corresponding to the target sheet, and there is a problem that the information cannot be added to the setting identification information itself. In the technique described in Patent Literature 3, since a designated mark is provided on the target, there is a problem that the surveyor needs to install the survey machine at a position facing the target in order to improve an accuracy of the measured values. In the technique described in Patent Literature 4, it is necessary to provide a spiral pattern display separately from the target, and there is a problem that information cannot be added to the pattern display itself.

In the techniques described in Patent Literatures 5, 7 and 8, there is a problem that information cannot be associated with a mark. In the technique described in Patent Literature 6, since a QR code (registered trademark) having a lot of fine grids is adopted as a 2D bar code, there is a problem that the 2D bar code cannot be recognized at a survey site.

Accordingly, the present invention was created as a solution for the problems and aims at providing a survey system and a survey method that can reduce time and effort of surveying, collimate with high accuracy, and accurately associate measured values.

Solution to Problem

The survey system according to the present invention includes a capturing control part, a recognizing control part, an information displaying control part, a calculating control part, an adjusting control part, a ranging control part, and an information storing control part. The capturing control part captures a captured image including a 2D mark previously installed on a survey object of an architecture using a telescope of a survey machine. The recognizing control part detects a 2D mark image corresponding to the 2D mark in the captured image as a captured pattern, and recognizes a specific identification pattern corresponding to the captured pattern by collating the detected captured pattern with an identification pattern of a 2D mark in a mark information table. The information displaying control part acquires survey information including set values of 3D coordinates of the survey object, the survey information associated with the specific identification pattern from the mark information table when the recognition of the specific identification pattern is completed, and displays the survey information on the captured image. The calculating control part calculates differences between a mark center position of 2D coordinates of the 2D mark image in the captured image and a center position of 2D coordinates of a crosshair of the telescope. The adjusting control part adjusts a direction of the telescope so that the center position of the crosshair matches the mark center position based on the differences. The ranging control part ranges the mark center position as measured values of 3D coordinates in a state where the center position of the crosshair matched the mark center position using the survey machine. The information storing control part stores the measured values in the mark information table in association with the 2D mark of the specific identification pattern and the set values of the survey information when the ranging is completed.

The survey method according to the present invention includes a capturing control step, a recognizing control step, an information displaying control step, a calculating control step, an adjusting control step, a ranging control step, and an information storing control step. Each step of the survey method corresponds to each control part of the survey system.

Advantageous Effects of Invention

According to the present invention, it is possible to reduce time and effort of surveying, collimate with high accuracy, and accurately associate measured values.

BRIEF DESCRIPTION OF DRAWINGS

FIG. 1 is a schematic view of a survey system according to an embodiment of the present invention.

FIG. 2 is a functional block diagram of a survey system according to the embodiment of the present invention.

FIG. 3 is a flowchart for showing an execution procedure of a survey method according to the embodiment of the present invention.

FIG. 4A is a diagram showing an example of generation of a 2D mark and a mark information table.

FIG. 4B is a diagram showing an example of installation of the 2D mark.

FIG. 5A is a diagram showing an example of measuring a machine point of a survey machine at a survey site, and capturing a captured image including the 2D mark.

FIG. 5B is a diagram showing an example of a captured image when the survey machine is located in front of the 2D mark, and a captured image when the survey machine is located in the slant for the 2D mark.

FIG. 6A is a diagram showing an example of a captured image when the survey machine is located in the steep slant for the 2D mark, comparison of a captured pattern and an identification pattern, and displaying error.

FIG. 6B is a diagram showing an example of displaying survey information on the captured image, and calculating differences between a mark center position and a center position of a crosshair.

FIG. 7A is a diagram showing an example of guidance displaying arrow marks and a message in the captured image, and displaying a message when the center position of the crosshair matches the mark center position.

FIG. 7B is a diagram showing an example of displaying measured values and accuracies within control values, and a mark information table reflected measured values.

FIG. 8A is a diagram showing an example of displaying measured values and accuracies out of the control values, and a mark information table reflected measured values.

FIG. 8B is a diagram showing an example when plural 2D marks appear in one captured image, and when plural target sheets appear in one captured image.

FIG. 9A is a diagram showing an example of capturing a captured image including a 2D mark at a survey site.

FIG. 9B is a diagram showing an example of displaying measured values and accuracies within control values, and displaying measured values and accuracies out of the control values.

FIG. 10 is a diagram showing an example of displaying survey information when plural 2D marks appear in one captured image.

FIG. 11A is a diagram showing an example of an angle, a captured pattern, a detection rate, and a recognition rate in a 6×6 pattern.

FIG. 11B is a diagram showing an example of an angle, a captured pattern, a detection rate, and a recognition rate in a 7×7 pattern.

FIG. 12A is a perspective view and a plan view showing an outline of an experimental site using a 2D mark.

FIG. 12B is a diagram showing an example of captured images from the installation position "1" to the installation position "3".

FIG. 13A is a diagram showing an example of captured images from the installation position "4" to the installation position "6".

FIG. 13B is a diagram showing an example of an evaluation of installation positions, sizes, and measurement results in Examples (2D marks) and Comparative Examples (target sheets)

FIG. 14A is a perspective view showing an outline of an experimental site using paper including plural 2D marks and 2D marks.

FIG. 14B is photographs showing a situation of the experimental site.

FIG. 15 is a photograph showing an example of recognition of each of 2D mark images appeared on one captured image.

FIG. 16A is photographs showing an outline of paper including plural target sheets.

FIG. 16B is photographs showing results of automatic collimation for paper including plural target sheets.

FIG. 17A is photographs showing other results of automatic collimation for paper including plural target sheets.

FIG. 17B is photographs showing other results of automatic collimation for paper including plural target sheets.

FIG. 18A is a diagram showing examples when the 2D mark is square.

FIG. 18B is a diagram showing examples when the 2D mark is circular.

FIG. 19A is a diagram showing an example of Example of a 2D mark of a simple identification pattern, and Comparative Example of a 2D bar code of a complicated identification pattern.

FIG. 19B is a perspective view and a plan view showing an outline of an experimental site using marks of Example and Comparative Example.

FIG. 20 is photographs of each installation position showing recognition results of identification pattern with the 2D mark in Example.

FIG. 21 is a display showing unrecognized results of identification pattern with the 2D bar code of Comparative Example.

DESCRIPTION OF EMBODIMENTS

The preferred embodiments of the present invention will be explained below according to the attached drawings; thereby the present invention will be clearly understood. The embodiments below are examples materializing the present invention, and do not limit the technical scope of the present invention.

The survey system 1 (also referred to as a survey apparatus) according to the embodiment of the present invention basically includes a survey machine 10, a survey machine terminal device 11, a server 12, and a network 13. The survey machine 10 and the survey machine terminal device 11 are carried by a surveyor and brought to a survey site. At the survey site, a 2D mark 15 is installed on a survey object 14a (for example, a pole head) of an architecture 14 (for example, a pole).

Further, the survey system 1 may further include an office terminal device 16, and an administrator terminal device 17. The office terminal device 16 is provided at a base such as an office or a factory. The administrator terminal device 17 is carried by an administrator, and brought to the survey site.

The survey machine 10 is generally used at construction sites and civil engineering sites, and enables an automatic collimation and an automatic tracking. The survey machine terminal device 11 is a generally used computer, includes a small computer, and is externally connected to the survey machine 10 or built-in the survey machine 10. The survey machine terminal device 11 controls an operation of the survey machine 10 based on a command from the surveyor. The survey machine terminal device 11 acquires information from the server 12 and transmits a survey result from the survey machine 10 to the server 12 via the network 13.

The survey machine 10 includes a main body 100 and a (collimation) telescope 101. The main body 100 is comprised to be rotatable in a horizontal direction. The telescope 101 is provided to be rotatable in a vertical direction to the main body 100. Therefore, the telescope 101 can rotate in the horizontal direction and the vertical direction to the survey machine 10.

The telescope 101 has a function of a digital camera and can capture an image (take a picture) of an object in an observation direction (direction of an optical axis) of the telescope. The digital camera includes a light receiving element (for example, a CCD image element, or a CMOS image element) installed parallel to an optical axis of a lens of the telescope 101. A center of a captured image of the light receiving element matches the optical axis of the telescope, so a center position of a crosshair of the captured image captured by the digital camera matches a measured position on a surface of the object collimated and ranged by the telescope.

The 2D mark 15 has an identification pattern that can be uniquely identified. The configuration of the identification pattern is not particularly limited. For example, when the 2D mark 15 is a square, the identification pattern is a pattern obtained by forming plural grids by dividing a vertical length evenly by a predetermined number and dividing a horizontal length evenly by a predetermined number, and coloring each of grids with white or black, and the identification pattern is configured to be uniquely identifiable. The form of the 2D mark 15 is not particularly limited, and the 2D mark 15 may be a printed matter, a sticker, a label, or the like, or may be directly printed or 3D printed on the survey object 14a of the architecture 14. The shape of the 2D mark 15 is not particularly limited, and the 2D mark 15 may be include a square, a rectangle, a circle, an ellipse, or the like.

When a collimation of the telescope 101 of the survey machine 10 matches the center position of the 2D mark 15 and a measuring command is input to the survey machine 10, the survey machine 10 irradiates the center position of the 2D mark 15 with scanning light from the telescope 101, the scanning light is reflected from a mark center position of the 2D mark 15, and the scanning light is incident on the telescope 101 again. The incident reflected light is converted into a light received signal by the light receiving element of the survey machine 10. The survey machine 10 detects a horizontal angle and a vertical angle of the telescope 101 with an angle detector. Then, an electronic distance meter of the survey machine 10 measures a sloped distance from the survey machine 10 to the mark center position of the 2D mark 15 by using the light received signal. The electronic distance meter has a predetermined mode with a reflecting prism and a target sheet, and a non-prism mode without a reflecting prism and a target sheet. In the present invention, the non-prism mode is the basis. The main body 100 (measurement part) of the survey machine 10 measures coordinates (3D coordinates, 3D coordinate values) of the mark center position of the 2D mark 15 based on the detected horizontal and vertical angles of the telescope 101 and the measured sloped distance as measured values of 3D coordinates. For example, the coordinates of the mark center position of the 2D mark 15 are calculated based on 3D coordinates of a machine point of the survey machine 10.

The server 12 is a generally used computer, and stores information from the survey machine terminal device 11 in a storage medium and outputs information from the storage medium. The server 12 is communicably connected to the office terminal device 16 and the administrator terminal device 17 via the network 13, and acquires and outputs information to the office terminal device 16 and the administrator terminal device 17.

The network 13 is communicably connected to the survey machine terminal device 11, the server 12, the office terminal device 16, and the administrator terminal device 17, respectively. The network 13 includes Wifi (registered trademark), LAN (Local Area Network) via access point, WAN (Wide Area Network) via wireless base station, third generation (3G) communication method, 4th generation (4G) communication method such as LTE, 5th generation (5G) and later communication method, Bluetooth (registered trademark), and specified low power wireless system.

The office terminal device 16 and the administrator terminal device 17 are commonly used computers, and include a desktop terminal device, a mobile terminal device with a touch panel, a tablet terminal device, and a wearable terminal device. The office terminal device 16 is operated by a third party such as an office or a factory, accesses the server 12 via the network 13, reads data of the server 12, and displays the data on the office terminal device 16. The administrator terminal device 17 is the same as the office terminal device 16.

The survey machine terminal device 11, the server 12, the office terminal device 16 and the administrator terminal device 17 include an input part for inputting a command, a storage part for accumulating information, and a display part for displaying information. The survey machine 10, the survey machine terminal device 11, the server 12, the office terminal device 16 and the administrator terminal device 17 have a built-in CPU, ROM, RAM, etc. (not shown), the CPU uses the RAM as a work area, and executes a program stored in the ROM or the like. About below each control part, the CPU realizes functions of each control part by executing programs.

Next, the configuration and the execution procedure according to the embodiment of the present invention will be described with reference to FIGS. 2 to 10. First, when a user such as a surveyor or an administrator instructs a generating command of a 2D mark 15 for survey by using the office terminal device 16 at a base site such as an office or a factory, a generation control part 201 of the office terminal device 16 generates a 2D mark 15 (FIG. 3: S101).

The generation method of the generation control part 201 is not particularly limited. For example, as shown in FIG. 4A, the generation control part 201 generates a 2D mark 15 having a specific identification pattern P by using a dictionary for the 2D mark 15 based on the generating command of the user. The 2D mark 15 is comprised to be a square. The identification pattern P of the 2D mark 15 is a pattern obtained by forming plural grids by dividing a vertical length evenly by six and dividing a horizontal length evenly by six, and coloring each of grids with white or black, and is comprised to be uniquely identifiable.

When the generation of the 2D mark 15 is completed and the user inputs predetermined survey information {for example, set values (x0, y0, z0) of 3D coordinates}, a relating control part 202 of the office terminal device 16 stores the survey information in association with the generated 2D mark 15 (FIG. 3: S102).

The survey information means information necessary for survey using the 2D mark 15, and includes at least set values related to a survey result. For example, when the 2D mark 15 is installed at a pole head 14a of a pole 14, the survey information may include information related to the pole such as a survey site name, a street name, a section, and control values of 3D coordinates in addition to the set values. The survey information may include information related to a manufacture of the pole 14 (manufacturer, date of manufacture, etc.). If the types of the architecture 14 and the survey object 14a are different, the survey information is appropriately designed.

The relating control part 202 is not particularly limited. For example, as shown in FIG. 4A, the relating control part 202 accesses the server 12 via the network 13 and refers to the mark information table 400 of the server 12. In the mark information table 400, 2D mark item 401 and survey information item 402 are associated and stored as a database.

Therefore, the relating control part 202 stores the previously generated 2D mark 15 in the 2D mark item 401 of the mark information table 400, and also stores the previously input survey information 403 {set values (x0, y0, z0)} in the survey information item 402 of the mark information table 400. In this way, it is possible to associate the survey information 403 with the 2D mark 15.

When the association of the survey information 403 is completed, and the user installs the 2D mark 15 on the survey object 14a (for example, pole head) of the architecture 14 (for example, pole) (FIG. 3: S103).

The installation method of the 2D mark 15 is not particularly limited. For example, when installing the 2D mark 15 on the pole head 14a of the pole 14 at the survey site, as shown in FIG. 4B, by the user bringing the 2D mark 15 to the survey site and attaching the 2D mark 15 to the pole head 14a of the already existing pole 14, the 2D mark 15 can be installed. When the 2D mark 15 is installed on the pole head 14a of the pole 14 in the manufacturing factory of the pole 14, by a robot 404 for attaching the 2D mark 15 acquiring the 2D mark 15 from the server 12 or the office terminal device 16, and automatically attaching the 2D mark 15 to the pole head 14a of the pole 14 manufactured on a manufacturing line, the 2D mark 15 can be installed. In addition, if the robot 404 can print in 3D with a 3D printer, the robot 404 may automatically print the 2D mark 15 in 3D on the pole head 14a of the pole 14. Of course, in the manufacturing factory of the pole 14, the user may directly attach the 2D mark 15 to the pole head 14a of the pole 14.

If there are plural survey objects, the process returns to S101 and the processes from S101 to S103 are repeated.

When the 2D mark 15 is installed on the pole head 14a of the pole 14 at the survey site, or the pole 14 transported from the manufacturing factory of the pole 14 to the survey site is installed at a predetermined position and the 2D mark 15 is installed on the pole head 14a of the pole 14, a preparation of the survey is complete.

Therefore, a surveyor brings a survey machine 10 having the survey machine terminal device 11 to the survey site, and as shown in FIG. 5A, the surveyor installs the survey machine 10 at a place where the 2D mark 15 installed on the pole head 14a of the pole 14 can be seen. When the surveyor operates the survey machine 10 to measure a machine point of the survey machine 10, the survey machine 10 measures 3D coordinates (xm, ym, zm) of the machine point M (FIG. 3: S201).

The measurement method of the coordinates (xm, ym, zm) of the machine point M is not particularly limited. For example, at the installation location of the survey machine 10, the surveyor collimates and ranges two known points respectively, and measures the coordinates (xm, ym, zm) of the machine point M of the survey machine 10 based on a distance and an azimuthal angle of each of the two known points centered on the survey machine 10. Other known methods may be used. By measuring the coordinates (xm, ym, zm) of the machine point M of the survey machine 10, it is possible to calculate 3D coordinates of the mark center position of the 2D mark 15 described later on the basis of coordinates (xm, ym, zm) of the machine point M of the survey machine 10.

When the measurement of the coordinates (xm, ym, zm) of the machine point M is completed, the surveyor operates the survey machine terminal device 11, turns the telescope 101 of the survey machine 10 to the 2D mark 15 on the pole head 14a of the pole 14 automatically or manually, and instructs a capturing command to the survey machine terminal device 11. Then, a survey machine capturing control part 203 of the survey machine terminal device 11 captures a captured image including the 2D mark 15 on the pole head 14a of the pole 14 using the telescope 101 of the survey machine 10 (FIG. 3: S202).

The capturing method of the survey machine capturing control part 203 is not particularly limited. For example, as shown in FIG. 5A, the surveyor operates the survey machine terminal device 11 while looking at the pole head 14a of the pole 14 with the telescope 101 or the survey machine terminal device 11, and collimates a vicinity of the pole head 14a including the 2D mark 15. Then, the survey machine capturing control part 203 captures a captured image seen by the telescope 101.

While the surveyor looks at the vicinity of the pole head 14a including the 2D mark 15 with the telescope 101, as shown in FIG. 5B, the surveyor operates the survey machine terminal device 11, and moves a center position C of a crosshair indicating a center position (optical axis, focal point) of the captured image 500 in the captured image 500 toward the 2D mark 15. Then, the survey machine capturing control part 203 captures a captured image seen by the telescope 101 with the movement of a direction of the telescope 101. The survey machine capturing control part 203 may appropriately perform focus processing that focuses on the 2D mark 15 appeared in the captured image 500 when the captured image 500 is captured.

When the survey machine capturing control part 203 starts capturing the captured image, a survey machine recognizing control part 204 recognizes a specific identification pattern corresponding to a captured pattern by collating a captured pattern of a 2D mark image corresponding to the 2D mark 15 with an identification pattern of the 2D mark 15 in the mark information table 400 (database) (FIG. 3: S203).

The recognizing method of the survey machine recognizing control part 204 is not particularly limited. For example, as shown in FIG. 5B, the survey machine recognizing control part 204 detects a 2D mark image 501 in the captured image. When detecting the 2D mark image 501, the survey machine recognizing control part 204 may perform image processing such as binarization processing, and facilitate the detection of the 2D mark image 501.

The detection method of the survey machine recognizing control part 204 is not particularly limited. For example, the survey machine recognizing control part 204 searches a shape image corresponding to a shape of an identification pattern P in the captured image 500, the shape image in which a peripheral end is colored with a predetermined color (for example, black) as a 2D mark image 501, detects an internal pattern except the peripheral end in the searched 2D mark image 501 as a capturing pattern Q. The shape image depends on the shape of the identification pattern P, and is basically a square or a circle. But the shape image may be a rhombus or an ellipse depending on the position of the survey machine 10 with respect to the 2D mark 15. In this way, since the shape image is rare at the survey site, the 2D mark image 501 can be immediately searched. Further, by using the peripheral end for search, and the internal pattern except the peripheral end for the pattern, so that the 2D mark 15 can be given two functions.

In addition, when the survey machine recognizing control part 204 cannot search the 2D mark image 501 in the captured images 500, or when the captured pattern Q cannot be detected from the searched 2D mark image 501 (FIG. 3: S203NO), the survey machine recognizing control part 204 displays an error to promote appropriate capturing of the 2D mark 15 on the captured image 500 (FIG. 3: S204). In this way, it is possible to encourage the surveyor to appropriately capture the 2D mark 15 with the telescope 101. In this case, the process returns to S201 and the process is repeated.

Next, the survey machine recognizing control part 204 accesses the server 12, refers to the 2D mark 15 of the 2D mark item 401 of the mark information table 400, compares the captured pattern Q of the detected 2D mark image 501 with the identification pattern P of the referenced 2D mark 15, and determine whether or not the capturing pattern Q matches the identification pattern P.

For example, the determination whether or not the captured pattern Q matches the identification pattern P is done by determining whether a color arrangement of grids comprising of the captured pattern Q matches a color arrangement of grids comprising of the identification pattern P. Specifically, as shown in FIG. 5B, so the identification pattern P of the 2D mark 15 evenly divides the vertical length by six and evenly divides the horizontal length by six, the survey machine recognizing control part 204 evenly divides a vertical length of the captured pattern Q of the 2D mark image 501, evenly divides a horizontal length of the captured pattern Q, and classifies plural grids q formed by the division into white or black. Regarding the color classification of the grids p, it may be easy to classify by performing image processing such as binarization processing of the image. And, the survey machine recognizing control part 204 compares the color arrangement of the grids q of the captured pattern Q with the color arrangement of the grids p of the identification pattern P, and recognizes (specifies) the identification pattern P of the color arrangement of the grids p matching the color arrangement of the grids q of the captured pattern Q.

Further, when the survey machine 10 is located in front of the 2D mark 15, the 2D mark image 501 corresponding to the 2D mark 15 appears in a square. In this case, the survey machine recognizing control part 204 recognizes the identification pattern P from the mark information table 400 by comparing the captured pattern Q of the square 2D mark image 501 with the identification pattern P of the 2D mark 15 of the mark information table 400 (FIG. 3: S203YES).

When the survey machine 10 is located in a slant for the 2D mark 15, the 2D mark image 503 corresponding to the 2D mark 15 is deformed into a rhombus, and appears as the rhombus in the captured image 502. In this case, although the 2D mark image 503 is slightly deformed, it is possible to specify this color arrangement of each grid q and recognize which the identification pattern P the captured pattern Q of the 2D mark image 601 is. Therefore, the survey machine recognizing control part 204 recognizes the identification pattern P matching the captured pattern Q from the mark information table 400 by comparing the captured pattern Q of the rhombus 2D mark image 503 with the identification pattern P of the 2D mark 15 of the mark information table 400 (FIG. 3: S203YES). In this way, even when the survey machine 10 exists at a slant position for the 2D mark 15, it is possible to detect and recognize the 2D mark 15. Further, even if a light reflecting object exists in the vicinity of the pole head 14a of the pole 14, the 2D mark 15 is not specified based on a reflected light, so that the 2D mark 15 can be appropriately recognized.

As shown in FIG. 6A, when the survey machine 10 is located in a steep slant for the 2D mark 15, the 2D mark image 601 corresponding to the 2D mark 15 appears as a greatly deformed rhombus shape. In this case, even if the survey machine recognizing control part 204 can detect the 2D mark image 601, the 2D mark image 601 is deformed too much, and the grids q are crushed or overlapped. It is not possible to specify this color arrangement of each grid q, and it is not possible to recognize which identification pattern P the captured pattern Q of the 2D mark image 601 is. Even if the survey machine recognizing control part 204 compares the captured pattern Q of the greatly deformed rhombus-shaped 2D mark image 601 with the identification pattern P of the 2D mark 15 of the mark information table 400, it is not possible to recognize the identification pattern P matching pattern from the mark information table 400 (FIG. 3: S203NO). In this case, as shown in FIG. 6A, the survey machine recognizing control part 204 displays an error 602 (for example, "Error, it cannot be recognized. Please change location.") to promote appropriate moving the survey machine 10 on the captured image 600 (FIG. 3: S204). In this way, if the installation position of the survey machine 10 is inappropriate so that the 2D mark 15 cannot be recognized, it is possible to inform the surveyor that and it is possible to encourage a re-installation of the survey machine 10 so that the installation position of the survey machine 10 is appropriate. In this case, the process returns to S201 and the process is repeated.

As another collation method of the survey machine recognizing control part 204, the following can be mentioned. For example, by the survey machine recognizing control part 204 collates the captured ID number whose captured pattern Q is converted according to a predetermined rule, with the identification ID number whose identification pattern P is converted according to the rule, and matches the captured pattern Q with the identification pattern P. The rule can uniquely determine a specific ID number from the color arrangement of the grids comprising the captured pattern Q and the identification pattern P. The identification ID number is obtained by converting the identification pattern P of the 2D mark 15 of the mark information table 400 according to the rule, and is stored in advance in the identification pattern P of the 2D mark 15 of the mark information table 400. In this way, at the survey site, the detected captured pattern Q may be converted into a captured ID number according to the rule and collated with the previously converted identification ID number, so that the accuracy of the collation can be improved.

When the recognition of the specific identification pattern P is completed, a survey machine information displaying control part 205 of the surveying instrument terminal device 11 displays survey information associated with a specific identification pattern P, the survey information including set values of 3D coordinates of the pole head 14a of the pole 14, on the captured image 603 (FIG. 3: S205).

The displaying method of the survey machine information displaying control part 205 is not particularly limited. For example, as shown in FIG. 6B, the survey machine information displaying control part 205 accesses the server 12, acquires survey information 403 {set values (x0, y0, z0), etc.} associated with the 2D mark 15 having the recognized specific identification pattern P in the surveying information items 402 of the mark information table 400, and displays the survey information 403 on the captured image 603. In this way, the surveyor can easily grasp the survey information 403 of the pole head 14a of the pole 14 on which the 2D mark 15 is installed via the captured image 603. Further, by displaying the survey information 403 on the captured image 603, the surveyor can reconfirm the survey object, and it is possible to prevent human error such as a surveyor's mistake or misunderstanding.

When the displaying of the survey information 403 is completed, a calculating control part 206 of the survey machine terminal device 11 calculates differences (dix, diy) between a mark center position Cm of 2D coordinates of the 2D mark image 604 in the captured image 603 and a center position C of 2D coordinates of the crosshair in the captured image 603 of the telescope 101 (FIG. 3: S206).

The calculating method of the calculating control part 206 is not particularly limited. For example, as shown in FIG. 6B, the captured image 603 has a camera coordinate system (2D coordinate system) whose origin is a predetermined position (for example, lower left corner) of the captured image 603, a vertical direction is a y-axis, and a horizontal direction is a x-axis. Therefore, the calculating control part 206 acquires 2D coordinates of four corners a of the 2D mark image 604 in the captured image 603, and calculates 2D coordinates of the mark center position Cm of the 2D mark image 604 by calculating average values of the 2D coordinates of the four corners a of the 2D mark image 604. When the 2D mark image 604 is a quadrangle such as a square, the average values of the 2D coordinates of the four corners a of the 2D mark image 604 corresponds to the 2D coordinates of the mark center position Cm of the 2D mark image 604. The method that the calculating control part 206 calculates the 2D coordinates of the mark center position Cm of the dimension mark image 604 is not particularly limited, and other method may be used depending on the shape of the 2D mark image 604.

When the pole 14 is a prism, the 2D mark image 604 in the captured image 603 is unlikely to be distorted, but when the pole 14 is a cylinder, the 2D mark image 604 is likely to be distorted. In that case, the calculating control part 206 corrects a distortion of the 2D mark image 604 by performing ortho-correction processing on the 2D mark image 604 in the captured image 603, acquires the 2D coordinates of the four corners a of the corrected 2D mark image 604, and calculates 2D coordinates of the mark center position Cm of the 2D mark image 604 by calculating the average values of the 2D coordinates of the four corners a of the 2D mark image 604.

Then, the calculating control part 206 acquires 2D coordinates of the center position C of the crosshair of the captured image 603, and calculates differences (dix, diy) between the 2D coordinates of the mark center position Cm and the 2D coordinates of the crosshair center position C by subtracting the 2D coordinates of the center position C of the crosshair from the 2D coordinates of the mark center position Cm of the 2D mark image 604.

When the calculation of the differences (dix, diy) is completed, an adjusting control part 207 of the survey machine terminal device 11 adjusts a direction of the telescope 101 so that the center position C of the crosshair matches the mark center position Cm based on the differences (dix, diy) (FIG. 3: S207).

The adjusting method of the adjusting control part 207 is not particularly limited. For example, as shown in FIG. 7A, the adjusting control part 207 displays a guidance display for adjusting from the center position C of the crosshair to the mark center position Cm on the captured image 603. Specifically, the adjusting control part 207 displays an arrow mark 700 from the center position C of the crosshair to the mark center position Cm on the captured image 603, and displays a message 701 (for example, "Match center position of crosshair with mark center position") for prompting to match the center position C of the crosshair with the mark center position Cm. In this way, it is possible to guide the surveyor to the direction of the telescope 101 in an appropriate direction.

The adjusting control part 207 displays the differences (dix, diy) on the captured image 603, when the center position C of the crosshair moves with the adjustment of the direction of the telescope 101, the adjusting control part 207 calculates and displays the differences (dix, diy) between the mark center position Cm and the crosshair center position C. In this way, the surveyor can adjust the direction of the telescope 101 to the 2D mark 15 while observing the differences (dix, diy).

Every time the surveyor moves the direction of the telescope 101, the adjusting control part 207 determines whether or not the differences (dix, diy) are within predetermined threshold values of 3D coordinates. The threshold values are set in advance by a surveyor, an administrator, or the like. When the differences (dix, diy) are out of the threshold values, the adjusting control part 207 can prompt the surveyor to adjust the direction of the telescope 101 by displaying the guidance such as the arrow mark 700 or the message 701.

The surveyor adjusts the direction of the telescope 101, the center position C of the crosshair is close to the mark center position Cm, and the differences (dix, diy) are within the threshold values. Then, the adjusting control part 207 determines that the differences are within the threshold values, and displays a message 702 (for example, "Please range") prompting ranging as shown in FIG. 7A. In this way, it is possible to easily collimate the 2D mark 15 and collimate with high accuracy. In addition, it is possible to appropriately inform the surveyor of the timing of ranging.

In the above description, the adjusting control part 207 adjusts the direction of the telescope 101 by the surveyor's manual by performing the above-mentioned guidance display, but other configurations may be used. For example, the adjusting control part 207 operates the telescope 101 in the horizontal direction and the vertical direction based on the differences (dix, diy), and adjusts the direction of the telescope 101 automatically so that the center position C of the crosshair matches the mark center position Cm. In this way, it is not necessary for the surveyor to adjust the direction of the telescope 101, and the surveyor only has to check whether or not the center position C of the crosshair matches the mark center position Cm, and it is possible to reduce time and effort of the surveyor. In addition, it is possible to make it difficult for human error with respect to collimation to occur by depending on a skill of the surveyor.

When the adjustment of the direction of the telescope 101 is completed, a ranging control part 208 of the survey machine terminal device 11 ranges the mark center position Cm as measured values od 3D coordinates in a state where the center position C of the crosshair matched the mark center position C using the survey machine 10 (FIG. 3: S208).

The ranging method of the ranging control part 208 is not particularly limited. For example, when the surveyor instructs a ranging command to the survey machine 10 via the survey machine terminal device 11, the ranging control part 208 uses the machine point M as the origin, measures the horizontal angle H and the vertical angle V of the telescope 101 with an existing angle detector, and measures a sloped distance L from the survey machine 10 to the mark center position Cm of the 2D mark 15 using a non-prism type light wave distance meter of the survey machine 10. Then, the ranging control part 208 calculates 3D coordinates (x1, y1, z1) of the mark center position Cm of the 2D mark 15 in three-dimensional coordinate system as measured values based on the horizontal angle H and the vertical angle V of the mark center position Cm of the 2D mark 15 and the sloped distance L. The three-dimensional coordinate system may be a world coordinate system or an arbitrary coordinate system defined at a survey site.

For example, the horizontal angle H measured by the survey machine 10 is defined that the X direction (for example, true north) is 0 degree, and the direction of rotation in the Y direction (true west) is a positive value in the three-dimensional coordinate system. The vertical angle V measured by the survey machine 10 is defined that the Z direction (for example, directly above) is 0 degree, and the direction of rotation from above to below is a positive value in the three-dimensional coordinate system.

When the ranging is completed, an information storing control part 209 of the survey machine terminal device 11 stores the measured values (x1, y1, z1) in the mark information table 400 (database) in association with the 2D mark 15 of the specific identification pattern P and the set values (x0, y0, z0) of the survey information 403 (FIG. 3: S209).

The storing method of the information storing control part 209 is not particularly limited. For example, the information storing control part 209 calculates differences (accuracies) {dx1 (=x1−x0), dy1 (=y1−y0), Dz1 (=z1−z0)} between the measured values (x1, y1, z1) and the set values (x0, y0, z0), and determines whether or not the calculated differences (dx1, dy1, dz1) are within the control values of 3D coordinates of the survey information 403. The control values may be set in advance by a surveyor, an administrator, or the like.

As a result of the determination, when the differences (dx1, dy1, dz1) are within the control values, as shown in FIG. 7B, the information storing control part 209 displays the measured values 403a (x1, y1, z1) and the differences (accuracies) 403b (dx1, dy1, dz1) with the survey information 403 in the captured image 603. In this way, the surveyor can confirm the measured values 403a and the accuracies 403b of the survey result with the survey information 403.

When determining that the measured values 403a and the accuracies 403b are appropriate, the surveyor instructs a storing command to the survey machine terminal device 11. Thus, the information storing control part 209 accesses the server 12, and as shown in FIG. 7B, stores the measured values 403a (x1, y1, z1) and the differences (accuracies) 403b (dx1, dy1, dz1) to the survey information 403 of the survey information item 402 associated with the 2D mark 15 of the specific identification pattern P in the mark information table 400 (FIG. 3: S209YES). In this way, it is possible to reflect the measured values 403a and the accuracies 403b of the survey result in the survey information 403. In other words, the measured values 403a and the accuracies 403b of the survey result can be directly associated with the 2D mark 15 corresponding to the survey information 403.

As a result of the determination, when the differences (dx2, dy2, dz2) are out of the control values, the surveyor erroneously measures the 3D coordinates (x2, y2, z2) of the mark center position Cm of the 2D mark 15. Thus, as shown in FIG. 8A, the information storing control part 209 displays the measured values 403c (x2, y2, z2) and the differences (accuracies) 403d (dx2, dy2, dz2) to the survey information 403 in the captured image 603, and displays a message 800 prompting confirmation (for example, "Out of control values. Please check mark."). In this way, if the surveyor mistakenly measures a different 2D mark 15, it is possible to reconfirm the 2D mark 15 of the surveying object to the surveyor, and to give the surveyor an opportunity to re-do the survey.

When re-doing the survey, the surveyor instructs a non-storing command to the survey machine terminal device 11. Thus, the information storing control part 209 does not store the measured values 403c (x2, y2, z2) and the differences (accuracies) 403d (dx2, dy2, dz2) (FIG. 3: S209NO). Then, for example, the surveyor returns to S207 to adjust the direction of the telescope 101, or returns to S201 to re-install the survey machine 10 in an appropriate place.

Even if the differences (dx2, dy2, dz2) are out of the control values, when the surveyor determines that the measured values 403c and the accuracies 403d are stored, the surveyor instructs a storing command to the survey machine terminal device 11. Thus, the information storing control part 209 stores the measured values 403c and the differences 403d to the survey information 403 associated with the 2D mark 15 of the specific identification pattern P in the mark information table 400 (FIG. 3: S209YES). In this way, even if the measured values 403c and the differences 403d are any values, the surveyor can leave that in the mark information table 400. In the above description, the measured values 403c and the accuracies 403d are stored in the mark information table 400, but at least the measured values 403c may be stored.

If there are plural survey objects 14a of the architecture 14, the process may return to S201 and repeat the processes from S201 to S209.

In the present invention, in order to recognize, collimate, and range the 2D mark 15 instead of the target seal, it is possible to acquire the survey information 403 from the 2D mark 15 and to directly associate the measured values of the survey result with the 2D mark 15. Further, in the present invention, even if the 2D mark 15 is slightly deformed, it is possible to recognize the deformed 2D mark 15, and to recognize, collimate, and range each of the plural 2D marks 15 projected on one captured image.

For example, as shown in FIG. 8B, three 2D marks 15 are projected on one captured image 801. When one 2D mark 15a is represented by a square on the front surface, and two 2D marks 15b are represented by a rhombus shape on the left and right sides, the present invention appropriately recognizes the 2D marks 15a and 15b respectively. In this case, for example, when the surveyor specifies a specific 2D mark image by tapping (tapping the screen with a finger) or the like in the captured image 801, the calculating control part 206 calculates differences between a mark center position of the specific 2D mark image and a center position of a crosshair in the captured image of the telescope. Then, the adjusting control part 207 adjusts a direction of the telescope 101 so that the center position of the crosshair matches the mark center position based on the differences. In this way, it is possible to adjust the direction of the telescope 101 to the 2D mark 15 with a simple operation, to collimate with high accuracy.

In the case of the target sheet, three target sheets 18 are projected on one captured image 802, but the front target sheet 18a and the left and right target sheets 18b reflect the laser light of the survey machine 10, respectively. Therefore, the survey machine 10 detects the reflected light from the plural target sheets 18a and 18b, it is difficult to recognize one target, and it is difficult to collimate to the front target sheet 18a and the left and right target sheets 18b respectively. Of course, even if an automatic collimation function of the survey machine 10 is used, it is not possible to automatically recognize and collimate the front target sheet 18a and the left and right target sheets 18b respectively with the survey machine 10. In such a case, for example, when the first target sheet 18 is installed on one side surface of the pole head 14a of the pole 14, and the second target sheet 18 is installed on the other side surface adjacent to one side surface of the pole head 14a.

As described above, in the present invention, if the 2D mark 15 is recognizable in the captured image, it is possible to appropriately recognize and collimate the 2D mark 15 with high accuracy, and it is possible to reduce the number of the installations of the survey machine 10 compared to the target sheet 18, and reduce time and effort of the surveyor. Further, in the present invention, even if plural 2D marks 15 are present in one captured image 801, it is possible to appropriately recognize and collimate each 2D mark 15 with high accuracy, and to associate measured values with each 2D mark 15. Although the surveyor ranges the target sheet 18, it may be confused as to which target sheet 18 the measured values should be associated with. In the present invention, since the identification of the 2D mark 15 and the association of the measured values are automatically performed, it is possible to reliably prevent such human error.

By the way, at the survey site, after the survey results such as the survey values are associated and stored with respect to the 2D mark 15 installed on the pole head 14a of the pole 14, in order to confirm the survey result, the administrator visits the survey site with the administrator terminal device 17. Then, as shown in FIG. 9A, when the administrator directs a camera 17a of the administrator terminal device 17 toward the 2D mark 15 of the pole head 14a of the pole 14. When the administrator instructs a capturing command to the administrator terminal device 17, a terminal capturing control part 210 of the administrator terminal device 17 captures a captured image including the 2D mark 15 of the pole head 14a of the pole 14 by using the camera 17a of the administrator terminal device 17 (FIG. 3: FIG. S301).

When the terminal capturing control part 210 starts capturing a captured image, a terminal recognizing control part 211 of the administrator terminal device 17 detects a captured pattern of the 2D mark image corresponding to the 2D mark 15 in the captured image, and recognizes a specific identification pattern corresponding to the captured pattern by collating the detected captured pattern with the identification pattern of the 2D mark 15 in the mark information table 400 (database) (FIG. 3: S302).

The recognizing method of the terminal recognizing control part 211 is not particularly limited and is the same as the recognizing method of the survey machine recognizing control part 204, so the description thereof will be omitted.

When the recognition of the specific identification pattern is completed, a terminal information displaying control part 212 of the administrator terminal device 17 displays the survey information (set values, measured values, accuracies, etc.) associated with the specific identification pattern on the captured image (FIG. 3: S303).

The display method of the terminal information displaying control part 212 is not particularly limited. For example, the terminal information displaying control part 212 acquires the survey information 403 {set values (x0, y0, z0), measured values (x1, y1, z1), accuracies (dx1, dy1, dz1), etc.} associated with the 2D mark 15 having the recognized specific identification pattern in the survey information items 402 of the mark information table 400, and displays that on the captured image 900. In this way, the administrator can check the survey result of the pole head 14a of the pole 14 on which the 2D mark 15 is installed at a glance simply by checking the captured image 900.

When the accuracies (dx1, dy1, dz1) of the measurement information 403 is within the control values, the terminal information displaying control part 212 displays a message 902 indicating within the control values (for example, "within control values") in the vicinity of the 2D mark image 901 corresponding to the 2D mark 15. When the accuracies (dx2, dy2, dz2) of the measurement information 403 is out of the control values, the terminal information displaying control part 212 displays a message 903 indicating out of the control values (for example, "out of control values") in the vicinity of the 2D mark image 901 corresponding to the 2D mark 15. In this way, the administrator can at a glance confirm whether or not the survey result of the pole head 14a of the pole 14 on which the 2D mark 15 is installed is appropriate.

The terminal information displaying control part 212 may indicate the pole 14 within the control values with a color indicating permission (for example, blue) using the 2D mark 15, and indicate the pole 14 out of the control values by a disallowed color (for example, red). The functions of Augmented reality (AR) and mixed reality (MR) may be realized.

As shown in FIG. 10, when plural 2D marks 15 are projected on one captured image 1000, the terminal recognizing control part 211 detects each of the 2D mark images 1001 corresponding to the 2D marks 15, and recognizes a specific identification pattern corresponding to the captured pattern of each 2D mark image 1001. Then, the terminal recognizing control part 211 displays the survey information (set values, measured values, accuracies, etc.) associated with the specific identification pattern on the captured image 1000. As shown in FIG. 10, the terminal information displaying control part 212 provides the 2D mark image 1001 of each 2D mark 15 with a blowout line 1002, and displays the survey information 1003 {pole mark, knot, street, manufacturer, date of manufacture, status of building accuracies (after completion of final tightening, etc.), measured values, suitability within the control values and out of the control values, etc.}. In this way, it is easier for the administrator to check, and it is possible to the convenience of the administrator.

By linking the database having survey information with other survey systems (for example, 3D finished shape system, execution management system, etc.), it is easy to check finished shape at the site of the administrator on the survey site. Further, in recent years, since the recognition of the 2D mark 15 can be performed by a web browser, the terminal recognizing control part 211 does not need to be provided as an application in the administrator terminal device 17. The terminal recognizing control part 211 may be provided on the server of the network 13 accessible to the administrator terminal device 17 and function as a web browser.

As other usage method, for example, an administrator terminal device 17 equipped with a surveillance camera is installed at the survey site, and the 2D mark 15 of the survey object 14a (pole head) of the architecture 14 (pole) is recognized with the surveillance camera by continuously capturing the 2D mark 15, and confirming the survey information associated with the 2D mark 15 by the office terminal device 16 in the office, so a finished shape progress of the architecture 14 may be check at the office.

Further, in the embodiment of the present invention, the survey machine recognizing control part 204 is configured to be mounted on the survey machine terminal device 11. But the survey machine recognizing control part 204 may be mounted on the server 12 to mount the survey machine, and the survey machine capturing control part 203 of the terminal device 11 may send the captured image to the server 12. The survey machine recognizing control part 204 of the server 12 may recognize a specific identification pattern corresponding to the captured pattern of the 2D mark image using the captured image, and send the survey information associated with the identification pattern to the survey machine terminal device 11. The survey machine information displaying control part 205 of the survey machine terminal device 11 may display the surveying information on the captured image of the survey machine terminal device 11. Further, in the embodiment of the present invention, the captured image of the survey machine capturing control part 203 is a static image, but may be a moving image.

EXAMPLE

Hereinafter, the present invention will be specifically described with reference to Examples and Comparative Examples, but the present invention is not limited thereto.

First, we confirmed a recognition rate of a captured pattern after deformation. Specifically, a predetermined identification pattern was generated using a dictionary, and the captured pattern corresponding to the generated identification pattern was horizontally deformed at a predetermined angle (0 degree, 9 degrees, 18 degrees, 27 degrees). This angle simulates the angle moved to the left or right from the position facing the captured pattern. Then, we compared the captured pattern after the deformation with the identification pattern, and we confirmed whether or not the captured pattern after the deformation was recognized as the identification pattern. The identification patterns were a 6×6 pattern obtained by dividing a vertical length evenly by six and dividing a horizontal length evenly by six, and a 7×7 pattern obtained by dividing a vertical length evenly by seven and dividing a horizontal length evenly by seven. Then, 5000 identification patterns are generated, and as a result of transforming and collating 5000 captured patterns, if all the captured patterns could be detected without omission, a detection rate was evaluated as "○". When even one could not be detected, a detection rate was evaluated as "x". When a specific identification pattern could be recognized for each captured pattern, a recognition rate was evaluated as "○", and when even one could not be recognized, a recognition rate was evaluated as "x". The detection rate means whether or not the captured pattern itself can be detected, and the recognition rate means whether or not the captured pattern can be recognized (specified) as a specific identification pattern.

As a result, as shown in FIG. 11A, in the 6×6 pattern, the detection rate of the captured pattern was "○" when the deformation angle was in the range of 0 degree to 27 degrees. Even more surprisingly, the recognition rate of the captured pattern was "○" in the range of the deformation angle from 0 degree to 27 degrees.

Further, as shown in FIG. 11B, in the 7×7 pattern, the detection rate of the captured pattern was "○" when the deformation angle was in the range of 0 degree to 27 degrees. Even more surprisingly, the recognition rate of the captured pattern was "○" in the range of the deformation angle from 0 degree to 27 degrees.

In this way, it was found that even if the captured pattern is deformed, both the detection rate and the recognition rate are good, and the captured pattern can be recognized as a specific identification pattern.

Next, we actually captured an image using a 2D mark, collimated the 2D mark, and confirmed whether or not the 2D mark was collimated. Specifically, a 2D mark having a 6×6 identification pattern was printed in a predetermined size (length 50 mm×width 50 mm, length 100 mm×width 100 mm), and as shown in FIG. 12A, the 2D mark 15 was installed on an upper part 14a of a building 14 having a height of 11 m. Further, installation positions ("1", "2", "3") of the survey machine 10 were set in the order of distance from a lower part 14b of the upper part 14a in an opposite direction of the survey machine 10. The distance from the lower part 14b of the building 14 to the installation position "3" was set to 11 m. Next, installation positions ("4", "5", "6") of the survey machine 10 were set in the order of distance from the installation position "3" in the direction perpendicular to the opposite direction. The distance from the installation position "3" to the installation position "6" was set to 9 m. Then, we installed the survey machine 10 at the installation positions "1" to "6", captured the 2D mark 15 by using the surveying system 1 according to the present invention, recognized a specific identification pattern to correspond to the captured pattern of the 2D mark image, calculated differences between 2D coordinates of a mark center position and 2D coordinates of a center position of a crosshair of the telescope, adjusted a direction of the telescope, and tried to collimate. The collimation was performed by visually matching the mark center position calculated by the program with the center position of the crosshair of the telescope. When collimation was possible, it was evaluated as "○", and when collimation was not possible, it was evaluated as "x". Further, we installed a target sheet 18 instead of the 2D mark 15, instructed an automatic collimation command to the survey machine 10, and tried the automatic collimation. When the automatic collimation was possible, it was evaluated as "○", and when the automatic collimation was not possible, it was evaluated as "x". The result of collimation of the 2D mark 15 was used as an Example, and the result of collimation of the target sheet 18 was used as a Comparative Example.

As a result, as shown in FIG. 12B, it is possible to capture an image of the 2D mark 15 and calculate the differences between the mark center position and the center position of the crosshair of the telescope from the installation position "1" to the installation position "3", and it was found that it was possible to collimate. As shown in FIG. 13A, it is possible to capture an image of the 2D mark 15 and calculate the differences between the mark center position and the center position of the crosshair of the telescope even from the installation position "4" to the installation position "6", and it was found that it was possible to collimate with high accuracy.

Then, as shown in FIG. 13B, in Example, it was found that the evaluation was "○" in all the collimation results from the installation position "1" to the installation position "6", and the collimation could be performed with high accuracy. On the other hand, in Comparative Example, the evaluation was "○" in the result of the automatic collimation from the installation position "1" to the installation position "3", those positions corresponding to the opposite position, but the evaluation was "x" in the result of the automatic collimation of the installation position "4" corresponding to the slant position, and the installation positions "5" and "6" corresponding to the steep slant position. It could not be automatically collimated.

As described above, in the present invention, it was found that the survey machine 10 can collimate with high accuracy not only at the opposite position of the 2D mark 15 but also at the slant position. These results are superior to an angle (eg, 15 degrees) that can be automatically collimated by the survey machine.

Next, we captured an image using plural 2D marks that were close to each other, collimated, and confirmed whether or not collimation was possible. Specifically, as shown in FIG. 14A, the plural 2D marks 15 having a 6×6 identification pattern are printed on one sheet of paper 1400 in a predetermined size (length 50 mm×width 50 mm), and the paper 1400 was installed on the upper part 14a of the building 14 having a height of 13.8 m. Further, a position 12.0 m away from the lower part 14b of the upper part 14a installed the paper 1400 including the 2D mark 15 in an opposite direction was set as the opposite position 1401. Next, a position separated from the opposite position by 4.0 m in the direction perpendicular to the opposite direction was set as the installation position 1402. We installed the survey machine 10 at the installation position 1402, and as shown in FIG. 14B, and captured the 2D mark 15 in the paper 1400 by using the surveying system 1 according to the present invention. We recognized a corresponding specific identification pattern corresponding to the captured pattern of the 2D mark image, and tried to collimate. The result of the collimation of the 2D mark 15 was taken as an Example.

As a result, as shown in FIG. 15, it is possible to recognize a specific identification pattern for the captured pattern of each 2D mark image 1501 appeared on one captured image 1500, and it is possible to display an ID associated with the identification pattern. Further, it was found that it is possible to calculate the differences between the mark center position Cm of each 2D mark image 1501 and the center position C of the crosshair of the telescope 101 and it is possible to collimate with high accuracy.

As shown in FIG. 16A, we prepared a paper 1600 equivalent to the paper 1400 including plural 2D marks 15, placed plural target sheets 18 equivalent to the 2D marks 15 on the paper 1600, and installed the paper 1600 including the plural target sheets 18 on the upper part 14a on which the paper 1400 including the plural 2D marks 15 is installed. We instructed an automatic collimation command to the survey machine 10, and tried the automatic collimation. The result of the collimation of the target sheet 18 was used as a Comparative Example.

As a result, as shown in FIG. 16B, when the center position C of the crosshair of the telescope 101 existed at a predetermined position where the two target sheets 18 are close to each other, we started the automatic collimation, although the center position C of the crosshair of the telescope 101 was collimated with the center position of the nearest target sheet 18 so as to match the center position of the nearest target sheet 18 from the center position C of the crosshairs 101, the center position C of the crosshair of the telescope 101 was slightly deviated from the center position of the nearest target sheet 18, and it was found that the collimation accuracies were lowered. It is estimated that the presence of the plural target sheets 18 reduced the collimation accuracies. Further, as shown in FIGS. 17A and 17B, when the center position C of the crosshair of the telescope 101 existed at another position where the two target sheets 18 are close to each other, we started the automatic collimation, it was collimated so that the center position C of the crosshair of the telescope 101 was matched with the center of the telescope 101, and it was found that it was impossible to collimate with one target sheet 18. It is estimated that the survey machine 10 misidentified a light quantity distribution of the reflected light of the two target sheets 18 as the light quantity distribution of the reflected light of one target sheet 18 by detecting the reflected light from the two target sheets 18.

As described above, in the present invention, it was found that even if plural 2D marks 15 are present in one captured image, each of them can be appropriately collimated with high accuracy.

In the embodiment of the present invention, the surveying system 1 is configured to include each control part, but a program for realizing each control part may be stored in a storage medium and the storage medium may be provided. In this configuration, the program is read by a predetermined processing device, and the processing device realizes each control part. In that case, the program itself read from the recording medium exerts the effects of the present invention. Further, it is also possible to provide the steps executed by each control part as the surveying method of the present invention.

Further, in the embodiment of the present invention, the 2D mark 15 is configured as a square as shown in FIG. 18A, but the 2D mark 15 may be configured as a circle as shown in FIG. 18B. When the 2D mark 15 is a square, for example, the identification pattern may be a 6×6 pattern or a 7×7 pattern. Further, in an odd×odd pattern such as a 7×7 pattern, one target grid p0 to be collimated is provided at the center position of the identification pattern, and the target grid p0 to be collimated may be obtained by dividing the target grid p0 into 4 parts with a crosshair indicating the center position, and coloring 4 divided grids p0 with a predetermined color (for example, white or black) different from the top, bottom, left and right, and it is easy to collimate 4 grids p0.

Further, as shown in FIG. 18B, when the 2D mark 15 is a circle, for example, the identification pattern P is a pattern obtained by forming plural grids p by dividing a radius of the circle evenly by a predetermined number with concentric circles, dividing a central angle of the circle evenly by a predetermined number with a line extending from the center of the circle, and coloring each of grids p with white or black, and the identification pattern is configured to be uniquely identifiable. For example, the identification pattern may be a 3×12 pattern obtained by dividing a radius of the circle evenly by 3 with concentric circles, dividing a central angle of the circle evenly by 12 with a line extending from a center of the circle, and a 5×12 pattern obtained by dividing a radius of the circle evenly by 5 with concentric circles, dividing a central angle of the circle evenly by 12 with a line extending from a center of the circle. Even in the case of the circle 2D mark 15, similarly to the square 2D mark 15, a square p0 to be collimated is provided at the center position of the identification pattern. The target grid p0 to be collimated may be obtained by dividing the target grid p0 into 4 parts with a crosshair indicating the center position, and coloring 4 divided grids p0 with a predetermined color (for example, white or black) different from the top, bottom, left and right, and it is easy to collimate 4 grids p0. It is easy to collimate 4 grids p0.

The shape of the 2D mark 15 and the shape of the grid p of the identification pattern P may be a shape using a golden ratio of 1:1.62 from the point of view of ease of collimation.

In an Example of the present invention using a 2D mark of a simple identification pattern of a 7×7 pattern, and a Comparative Example using a 2D bar code with a complicated identification pattern {for example, equivalent to a QR code (registered trademark)}, the differences of the recognition rates of both are shown. Specifically, as shown in FIG. 19A, a 2D mark having an identification pattern of a 7×7 pattern (the number of grids is 49) was printed in a size of 50 mm in length×50 mm in width, and the 2D mark was a 2D mark of the Example. We added a collimable surveying marker to a center of a predetermined QR code (registered trademark) (pattern of about 40×40, the number of grids is 1600), the code was printed in a size of 50 mm in length×50 mm in width, and the 2D bar code was the Comparative Example. The software capable of decoding the 2D bar code of the Comparative Example was built into the surveying system in advance.

Next, as shown in FIG. 19B, two marks of the Example and the Comparative Example were installed side by side on the upper part of a building having a height of 11 m, installation positions ("1", "2") of the survey machine 10 were set in order of distance from the bottom of the upper part in the opposite direction, and installation positions ("3", "4") of the survey machine 10 were set in the order of distance from the installation position "2" in the direction perpendicular to the opposite direction. The distance from the bottom of the building to the installation position "1" was set to 6 m, the distance from the bottom of the building to the installation position "2" was set to 11 m, the distance from the installation position "2" to the installation position "3" was set to 8 m, and the distance from the installation position "2" to the installation position "4" was set to 19.1 m. Then, the survey machine 10 was installed at the installation positions "1" to "4", and the surveying system of the present invention was used to capture the two marks of the Example and the Comparative Example to confirm whether or not the two marks can be recognized.

As a result, as shown in FIG. 20, in the mark of the Example, the mark identification pattern could be recognized at any installation positions. Specifically, using a predetermined rule, the captured pattern could be converted into a captured ID number (id=5000), and a center position of the mark could be calculated. And, As shown in FIG. 21, in the mark of the Comparative Example, the mark could not be recognized in the image captured by the telescope of the survey machine (decoding failure).

In this way, the 2D bar code {equivalent to QR code (registered trademark)} in the Comparative Example cannot be recognized by capturing with the telescope of the survey machine at the survey site. The reason is that, originally, information in the 2D bar code of the Comparative Example is given to a fine black-and-white grids pattern. Unless there are more than a predetermined number of grids on the captured image, information cannot be detected and recognized. If the pattern of grids becomes complicated, as described above, when captured with the telescope of the survey machine at the survey site, the pattern of grids in the captured image becomes rough and the 2D bar code can be recognized accurately.

In the Example, detail information is not given to the identification pattern of the 2D mark. Therefore, by adopting the 2D mark having a simple identification pattern, it is possible to accurately recognize the identification pattern without the recognition rate of the captured pattern of the 2D mark image at the survey site lowering. Therefore, as described above, it is possible to acquire survey information from the mark information table and store the measured values in the mark information table. Since the number of grids is small in a predetermined number, a distinctiveness of the identification pattern can be given to the identification pattern. Even if 2D marks are installed on the survey objects of plural architectures, each of the 2D marks of each survey object can be identified. The survey information can be acquired for each survey object, and measured values can be associated and stored. In this way, it is possible to facilitate the recognition of a specific identification pattern at the survey site, reduce time and effort of surveying, and perform collimation with high accuracy.

In recent years, glasses-type devices that support AR (augmented reality) and have capturing function and ranging function have appeared, and such glasses-type devices can be used in place of survey machine.

In the 2D mark identification patterns, in addition to the 7×7 pattern, the number of grids in the 6×6 pattern is 36, and the number of grids in the 3×12 pattern is 36, and the number of grids in the 5×12 pattern is 60. These patterns have the same number of grids as the 7×7 pattern, they are simple identification patterns that can be identified at the survey site like the 7×7 pattern, and have the same effects as described above.

INDUSTRIAL APPLICABILITY

As described above, the surveying system and surveying method according to the present invention are useful in the fields of measurement, civil engineering, surveying, etc. of general structures, architectures, equipment, grounds, roads, vehicles, railways, etc. It is effective as a surveying system and surveying method that can reduce time and effort of surveying, collimate with high accuracy, and accurately associate measured values.

REFERENCE SIGNS LIST

1 Surveying system
10 Survey machine
11 Survey machine terminal device
12 Server
13 Network
201 Generation control part
202 Relating control part
203 Survey machine capturing control part
204 Survey machine recognizing control part
205 Survey machine information displaying control part
206 Calculation control part
207 Adjusting control part
208 Ranging control part
209 Information storing control part
210 Terminal capturing control part
211 Terminal recognizing control part
212 Terminal information displaying control part

The invention claimed is:

1. A survey system comprising:
a capturing control part capturing a captured image including a 2D mark previously installed on a survey object of an architecture using a telescope of a survey machine;
a recognizing control part detecting a 2D mark image corresponding to the 2D mark in the captured image as a capture pattern, and recognizing a specific identification pattern corresponding to a captured pattern by collating the detected 2D mark image with an identification pattern of a 2D mark in a mark information table;
an information displaying control part acquiring survey information including set values of 3D coordinates of the survey object, the survey information associated with the specific identification pattern from the mark information table when the recognition of the specific identification pattern is completed, and displaying the survey information on the captured image;
a calculating control part calculating differences between a mark center position of 2D coordinates of the 2D mark image in the captured image and a center position of 2D coordinates of a crosshair of the telescope;
an adjusting control part adjusting a direction of the telescope so that the center position of the crosshair matches the mark center position based on the differences;
a ranging control part ranging the mark center position as measured values of 3D coordinates in a state where the center position of the crosshair matched the mark center position using the survey machine; and
an information storing control part storing the measured values in the mark information table in association with the 2D mark of the specific identification pattern and the set values of the survey information when the ranging is completed,
wherein:
the identification pattern is selected from a 6×6 pattern in a square obtained by dividing a vertical length evenly by six and dividing a horizontal length evenly by six,
a 7×7 pattern in a square obtained by dividing a vertical length evenly by seven and dividing a horizontal length evenly by seven in a square,
a 3×12 pattern in a circle obtained by dividing a radius of the circle evenly by 3 with concentric circles, dividing a central angle of the circle evenly by 12 with a line extending from a center of the circle, or
a 5×12 pattern in a circle obtained by dividing a radius of the circle evenly by 5 with concentric circles, dividing a central angle of the circle evenly by 12 with a line extending from a center of the circle;
wherein: the surveying machine recognizing control part collates the captured pattern with the identification pattern by collating a captured ID number whose captured pattern is converted according to a predetermined rule, with an identification ID number whose identification pattern is converted according to the rule.

2. The survey system according to claim 1, wherein:
the survey machine recognizing control part searches a shape image corresponding to a shape of an identification pattern in the captured image, the shape image in which a peripheral end is colored with a predetermined color as a 2D mark image, and detects an internal pattern except the peripheral end in the searched 2D mark image as a capturing pattern.

3. The survey system according to claim 1, wherein:
the surveying machine recognizing control part displays an error to promote appropriate moving the surveying machine on the captured image when the surveying machine recognizing control part cannot detect the captured pattern, or when the surveying machine recognizing control part cannot collate the detected captured pattern with the identification pattern.

4. The survey system according to claim 1, wherein:
the surveying machine recognizing control part collates the captured pattern with the identification pattern by determining whether a color arrangement of grids comprising of the captured pattern matches a color arrangement of grids comprising of the identification pattern.

5. The survey system according to claim 1, wherein:
the calculating control part acquires coordinates of four corners of the 2D mark image in the captured image, and calculates coordinates of the mark center position of the 2D mark image by calculating average values of the coordinates of the four corners of the 2D mark image.

6. The survey system according to claim 1, wherein:
the adjusting control part determines whether or not the differences are within predetermined threshold values of 3D coordinates, when the differences are out of the threshold values, the adjusting control part prompts the surveyor to adjust the direction of the telescope by displaying a guidance display for adjusting from the center position of the crosshair to the mark center position on the captured image, and when the differences are within the threshold values, the adjusting control part displays a message prompting ranging.

7. The survey system according to claim 1, wherein:
a target grid to be collimated is provided at a center position of the identification pattern, and obtained by dividing the target grid into 4 parts with a crosshair indicating the center position of the identification pattern, and coloring 4 divided grids with a predetermined color different from the top, bottom, left and right.

8. The survey system according to claim 1, wherein:
the mark information table is provided in a server, the recognizing control part accesses the server, and collates the captured pattern with the identification pattern of the 2D mark in the mark information table of the server, the information displaying control part accesses the server, and acquires the survey information from the mark information table, and the information storing control part accesses the server, and stores the measured values in the mark information table.

9. A survey method comprising:
a capturing control step for capturing a captured image including a 2D mark previously installed on a survey object of an architecture using a telescope of a survey machine;
a recognizing control step for detecting a 2D mark image corresponding to the 2D mark in the captured image as a capture pattern, and recognizing a specific identification pattern corresponding to a captured pattern by collating the detected 2D mark image with an identification pattern of a 2D mark in a mark information table;
an information displaying control step for acquiring survey information including set values of 3D coordinates of the survey object, the survey information associated with the specific identification pattern from the mark information table when the recognition of the specific identification pattern is completed, and displaying the survey information on the captured image;
a calculating control step for calculating differences between a mark center position of 2D coordinates of the 2D mark image in the captured image and a center position of 2D coordinates of a crosshair of the telescope;
an adjusting control step for adjusting a direction of the telescope so that the center position of the crosshair matches the mark center position based on the differences;
a ranging control step for ranging the mark center position as measured values of 3D coordinates in a state where the center position of the crosshair matched the mark center position using the survey machine; and
an information storing control step for storing the measured values in the mark information table in association with the 2D mark of the specific identification pattern and the set values of the survey information when the ranging is completed,
wherein:
the identification pattern is selected from a 6×6 pattern in a square obtained by dividing a vertical length evenly by six and dividing a horizontal length evenly by six,
a 7×7 pattern in a square obtained by dividing a vertical length evenly by seven and dividing a horizontal length evenly by seven in a square,
a 3×12 pattern in a circle obtained by dividing a radius of the circle evenly by 3 with concentric circles, dividing a central angle of the circle evenly by 12 with a line extending from the center of the circle, or
a 5×12 pattern in a circle obtained by dividing a radius of the circle evenly by 5 with concentric circles, dividing a central angle of the circle evenly by 12 with a line extending from the center of the circle;
wherein: the surveying machine recognizing control part collates the captured pattern with the identification pattern by collating a captured ID number whose captured pattern is converted according to a predetermined rule, with an identification ID number whose identification pattern is converted according to the rule.

* * * * *